US009384757B2

(12) United States Patent
Sugiyama

(10) Patent No.: US 9,384,757 B2
(45) Date of Patent: Jul. 5, 2016

(54) SIGNAL PROCESSING METHOD, SIGNAL PROCESSING APPARATUS, AND SIGNAL PROCESSING PROGRAM

(75) Inventor: Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 640 days.

(21) Appl. No.: 13/499,556

(22) PCT Filed: Sep. 30, 2010

(86) PCT No.: PCT/JP2010/067121
§ 371 (c)(1), (2), (4) Date: Mar. 30, 2012

(87) PCT Pub. No.: WO2011/040549
PCT Pub. Date: Apr. 7, 2011

(65) Prior Publication Data

US 2012/0189138 A1 Jul. 26, 2012

(30) Foreign Application Priority Data

Oct. 1, 2009 (JP) ................................ 2009-229509

(51) Int. Cl.
*H04B 15/00* (2006.01)
*G10L 21/0272* (2013.01)

(52) U.S. Cl.
CPC ................................ *G10L 21/0272* (2013.01)

(58) Field of Classification Search
CPC .............. H04R 3/00; H04R 3/02; H04R 3/04; H04R 3/05; H04R 3/005; H04R 2410/07; G10L 21/0208; G10L 2021/02165
USPC ........................................................ 381/94.1
See application file for complete search history.

(56) References Cited

U.S. PATENT DOCUMENTS 5,828,756 A * 10/1998 Benesty et al. ................ 381/66
5,999,956 A * 12/1999 Deville ........................ 708/322
(Continued)

FOREIGN PATENT DOCUMENTS

JP 10-253385 A 9/1998
JP 2001-319420 A 11/2001
(Continued)

OTHER PUBLICATIONS

M J Al-Kindi, et al., "A Low Distortion Adaptive Noise Cancellation Structure for Real Time Applications", IEEE, Department of Electronic and Electrical Engineering, University of Strathclyde, 1987, pp. 2153-2156.
(Continued)

*Primary Examiner* — Simon Sing
(74) *Attorney, Agent, or Firm* — Sughrue Mion, PLLC

(57) ABSTRACT

A desired signal is extracted with a higher accuracy from a mixed signal wherein a plurality of signals are mixed. At the time of extracting a first signal from a first mixed signal and a second mixed signal, said first mixed signal and second mixed signal having the first signal and second signal mixed therein, an estimate value of the first signal in the past is obtained as a first estimate value, and an estimate value of the second signal in the past is obtained as a second estimate value. Then, a first isolation signal is generated by subtracting the second estimate value from the first mixed signal, and a second isolation signal is generated by subtracting the first estimate value from the second mixed signal. Then, the signal generated using the first isolation signal and the second isolation signal is outputted as the first signal.

18 Claims, 12 Drawing Sheets

(56) References Cited

U.S. PATENT DOCUMENTS

| | | | | |
|---|---|---|---|---|
| 6,377,637 | B1 | 4/2002 | Berdugo | |
| 6,480,610 | B1 | 11/2002 | Fang et al. | |
| 6,700,980 | B1 * | 3/2004 | Hamalainen | H04S 1/002 381/1 |
| 2003/0026437 | A1 * | 2/2003 | Janse et al. | 381/71.4 |
| 2006/0210091 | A1 * | 9/2006 | Okumura | 381/71.11 |
| 2007/0055511 | A1 * | 3/2007 | Gotanda | G10L 21/0208 704/233 |
| 2008/0015845 | A1 * | 1/2008 | Schmidt et al. | 704/200 |
| 2008/0031466 | A1 * | 2/2008 | Buck et al. | 381/66 |
| 2009/0058724 | A1 * | 3/2009 | Xia | H01Q 3/2605 342/368 |
| 2009/0154713 | A1 * | 6/2009 | Kamiya | 381/1 |
| 2009/0190774 | A1 * | 7/2009 | Wang et al. | 381/92 |

FOREIGN PATENT DOCUMENTS

| | | | |
|---|---|---|---|
| JP | 2003-529968 | A | 10/2003 |
| JP | 2004-502977 | A | 1/2004 |
| JP | 2006-330687 | A | 12/2006 |
| JP | 2009-020427 | A | 1/2009 |

OTHER PUBLICATIONS

Bernard Widrow, et al., Adaptive Noise Cancelling: Principles and Applications, Proceedings of the IEEE, Dec. 1975, pp. 1-26, vol. 63, No. 12.

Kenji Nakayama, et al., "Effects of Propagation Delays and Sampling Rate on Feed-Back BSS and Comparative Studies With Feed-Forward BSS", Graduate School of Natural Science and Technology, Kanazawa, University, 5 pages; Sep. 2008.

* cited by examiner

SIGNAL PROCESSING METHOD, SIGNAL PROCESSING APPARATUS, AND SIGNAL PROCESSING PROGRAM

CROSS REFERENCE TO RELATED APPLICATIONS

This application is a National Stage of International Application No. PCT/JP2010/067121 filed Sep. 30, 2012, claiming priority based on Japanese Patent Application No. 2009-229509. filed Oct. 1, 2009, the contents of all of which arc incorporated herein by reference in their entirety.

TECHNICAL FIELD

The present invention relates to a signal processing technique for extracting a desired signal from a mixed signal in which a plurality of signals are mixed.

BACKGROUND ART

There are signal processing techniques for extracting a desired signal from a plurality of mixed signals. For example, a noise canceller (noise eliminating system) is a system for eliminating a noise superimposed over a desired voice signal (referred to hereinbelow as a desired signal). NPL 1 discloses a method of eliminating a noise using an adaptive filter. The method eliminates a noise by using an adaptive filter to estimate properties of an acoustic channel from a noise source to a microphone, processing a signal having a correlation with a noise (referred to hereinbelow as a noise-correlated signal) by the adaptive filter to produce a pseudo noise, and subtracting the pseudo noise from a mixed signal over which a noise is superimposed.

According to the technique disclosed in NPL 1, a desired signal component, sometimes referred to as crosstalk, may leak into the noise-correlated signal, and when a pseudo noise is produced using the noise-correlated signal having a crosstalk, part of an output signal is subtracted to cause distortion in the output signal. As a configuration for preventing such distortion, a cross-coupled noise canceller is disclosed in NPL 2, in which an adaptive filter capable of handling a crosstalk is installed to produce a pseudo crosstalk so that the noise and crosstalk are eliminated at the same time.

The "cross-coupled noise canceller" disclosed in NPL 2 will now be explained with reference to FIG. 10. A desired signal $s_1(k)$ from a desired signal source 910 can be assumed to be convolved with an impulse response $h_{11}$ (a transfer function $H_{11}$) of an acoustic space from the desired signal source 910 to a microphone 901 before the signal $s_1(k)$ reaches the microphone 901. On the other hand, a noise $s_2(k)$ from the noise source 920 can also be assumed to be convolved with an impulse response $h_{21}$ (a transfer function $H_{21}$) of an acoustic space from the noise source 920 to the microphone 901 before the noise $s_2(k)$ reaches the microphone 901. Therefore, a voice signal $x_1(k)$ output from the microphone 901 at a time k is a mixed signal expressed by EQ. (1) below.

Similarly, the desired signal $s_1(k)$ from the desired signal source 910 can be assumed to be convolved with an impulse response $h_{12}$ (a transfer function $H_{12}$) of an acoustic space from the desired signal source 910 to a microphone 902 before the signal $s_1(k)$ reaches the microphone 902. On the other hand, the noise $s_2(k)$ from the noise source 920 can also be assumed to be convolved with an impulse response $h_{22}$ (a transfer function $H_{22}$) of an acoustic space from the noise source 920 to the microphone 902 before the noise $s_2(k)$ reaches the microphone 902. Therefore, a voice signal $x_2(k)$ output from the microphone 902 at the time k is a mixed signal expressed by EQ. (2) below.

[Equation 1]

$$x_1(k)=\sum_{j=0}^{M1-1} h_{11}(j)s_1(k-j)+\sum_{j=0}^{N1-1} h_{21}(j)s_2(k-j) \tag{1}$$

[Equation 2]

$$x_2(k)=\sum_{j=0}^{N2-1} h_{12}(j)s_1(k-j)+\sum_{j=0}^{M2-1} h_{22}(j)s_2(k-j) \tag{2}$$

In these equations, $h_{11}(j)$, $h_{12}(j)$, $h_{21}(j)$, $h_{22}(j)$ correspond to the transfer functions $H_{11}$, $H_{12}$, $H_{21}$, $H_{22}$ each representing an impulse response at a sample index j. M1, M2, N1, N2 each represent the length of the impulse response in the mixing process, which is the number of taps in transforming the transfer functions $H_{11}$, $H_{12}$, $H_{21}$, $H_{22}$ into a filter. M1, M2, N1, N2 are related to the distances from the desired signal source 910 to the microphone 901, from the noise source 920 to the microphone 902, from the noise source 920 to the microphone 901, and from the desired signal source 910 to the microphone 902, and acoustic properties of the space, etc.

Especially, when the microphone 901 lies sufficiently close to the desired signal source 910, M1−1=0 and $h_{11}(0)=1$, so that EQ. (1) can be rewritten into EQ. (3) below.

[Equation 3]

$$x_1(k)=s_1(k)+\sum_{j=0}^{N1-1} h_{21}(j)s_2(k-j) \tag{3}$$

Similarly, when the microphone 902 lies sufficiently close to the noise source 920, M2−1=0 and $h_{22}(0)=1$, so that EQ. (2) can be rewritten into EQ. (4) below.

[Equation 4]

$$x_2(k)=\sum_{j=0}^{N2-1} h_{12}(j)s_1(k-j)+s_2(k) \tag{4}$$

At that time, an output $y_1(k)$ of a subtractor 903 is a signal obtained by subtracting an output $u_1(k)$ of an adaptive filter 907 from the signal $x_1(k)$ of the microphone 901, as expressed by EQ. (5) below. On the other hand, $y_2(k)$ is signal obtained by subtracting an output $u_2(k)$ of an adaptive filter 908 from the signal $x_2(k)$ of the microphone 902, as expressed by EQ. (6) below. In these equations, $w_{21,j}(k)$, $w_{12,j}(k)$ are coefficients of the adaptive filters 907, 908.

[Equation 5]

$$y_1(k)=x_1(k)-u_1(k)=x_1(k)-\sum_{j=0}^{N1-1} w_{21,j}(k)y_2(k-j) \tag{5}$$

-continued

[Equation 6]

$$y_2(k) = x_2(k) - u_2(k) = x_2(k) - \sum_{j=0}^{N2-1} w_{12,j}(k) y_1(k-j) \quad (6)$$

That is, the output $u_1(k)$ of the adaptive filter 907 is a pseudo noise, and the output $u_2(k)$ of the adaptive filter 908 is a pseudo crosstalk. Ultimately, $y_1(k)$ is output as a signal whose noise is eliminated at the noise canceller.

From the above EQs. (3) and (5), the noise-free signal output $y_1(k)$ is given by the following equation.

[Equation 7]

$$y_1(k) = s_1(k) + \sum_{j=0}^{N1-1} h_{21}(j) s_2(k-j) - \sum_{j=0}^{N1-1} w_{21,}(k) y_2(k-j) \quad (7)$$

That is, $y_1(k)=s_1(k)$ stands when $y_2(k)=s_2(k)$ and $w_{21,j}(k)=h_{21}(j)$, $(j=0, 1, 2, \ldots, N1-1)$, where perfect noise elimination can be achieved.

On the other hand, a system that can separate two signals in a similar configuration to that shown in FIG. 10 is disclosed in NPL 3 (a feed-back blind signal separation system). The feed-back blind signal separation system disclosed in NPL 3 will now be described with reference to FIG. 11. FIG. 11 is different from FIG. 10 in that the output $y_2(k)$ of the subtractor 904 is output as one of the extracted signals. Moreover, coefficients for adaptive filters 917, 918 are updated using $y_1(k)$ and $y_2(k)$ at a coefficient updating section 981.

In the blind signal separation system shown in FIG. 11, again, EQ. (7) stands when the microphones 901 and 902 lie sufficiently close to a first signal source 910 and a second signal source 930, respectively. Likewise, EQ. (8) below stands for $y_2(k)$.

[Equation 8]

$$y_2(k) = s_2(k) + \sum_{j=0}^{N2-1} h_{12}(j) s_1(k-j) - \sum_{j=0}^{N2-1} w_{12,j}(k) y_1(k-j) \quad (8)$$

Since perfect signal separation is achieved only when $y_1(k)=s_1(k)$ and $y_2(k)=s_2(k)$ stand, the following two equations should stand as a requirement therefor.

$$w_{21,j}(k)=h_{21}(j), j=0, 1, 2, \ldots, N1-1$$

$$w_{12,j}(k)=h_{12}(j), j=0, 1, 2, \ldots, N2-1$$

NPL 3 addresses a general case in which a condition that the microphone 901 and microphone 902 should lie sufficiently close to the first signal source 910 and second signal source 930 is not satisfied, and provides a requirement that the following equations should stand for perfectly separating signals.

$$w_{21,j}(k)=h_{21}(j)/h_{22}(j), j=0, 1, 2, \ldots, N1-1$$

$$w_{12,j}(k)=h_{12}(j)/h_{11}(j), j=0, 1, 2, \ldots, N2-1$$

CITATION LIST

Non Patent Literature

NPL 1: B. Widrow, "Adaptive Noise Cancelling: Principles and Applications," Proceedings of the IEEE, vol. 63, pp. 1692-1716, December 1975

NPL 2: M. J. Al-Kindi and J. Dunlop, "A low distortion adaptive noise cancellation structure for real time applications," Proceedings of ICASSP 1987, vol. 12, pp. 2153-2156, April 1987

NPL 3: K. Nakayama, A. Horita and A. Hirano, "Effects of propagation delays and sampling rate on feed-back BSS and comparative studies with feed-forward BSS," Proceedings of EUSIPCO 2008, 16th European Signal Processing Conference, Lausanne, Switzerland, CD-ROM, September 2008

SUMMARY OF INVENTION

Technical Problem

In the configurations disclosed in NPLs 2 to 3 above, however, to extract a desired signal from a mixed signal, current values (values at time k) of "other output signals" output as other signals (signals other than the desired signal) contained in the mixed signal are theoretically required. On the other hand, to determine the current values of the "other output signals," a current value of the "desired output signal" output as the desired signal is required, thus posing a problem of reciprocity. Accordingly, coefficients ($w_{12,0}(k)$ and $w_{21,0}(k)$ in the example shown in FIG. 11) corresponding to the current values of other output signals are set to zero in the filter to ignore them. Therefore, a desired signal may not successfully be extracted with accuracy, leading to degradation of quality of extracted output signals.

As such, an object of the present invention is to provide a signal processing technique to solve the aforementioned problem.

Solution to Problem

To attain the object described above, a signal processing method according to the present invention for extracting a first signal from a first mixed signal and a second mixed signal in which the first signal and a second signal are mixed, is characterized in comprising: determining an estimated value of said first signal in the past as a first estimated value; determining an estimated value of said second signal in the past as a second estimated value; removing said second estimated value from said first mixed signal to produce a first separated signal; removing said first estimated value from said second mixed signal to produce a second separated signal; and outputting a signal produced using said first separated signal and said second separated signal as said first signal.

To attain the object described above, another signal processing method according to the present invention for extracting a first signal using first to n-th mixed signals in which n signals from the first signal to an n-th signal are mixed, is characterized in comprising: for each natural number m from 1 to n, determining estimated values of the first to n-th signals in the past other than an m-th signal in the past, and removing the estimated values from an m-th mixed signal to produce an m-th separated signal; and producing a signal using said first to n-th separated signals, and outputting the signal as said first signal.

To attain the object described above, a signal processing apparatus according to the present invention is characterized in comprising: a first filter for producing, from a first mixed signal generated to have a first signal and a second signal mixed, an estimated value of said second signal in the past as a second estimated value; a first subtracting section for removing said second estimated value from said first mixed signal to produce a first separated signal; a second filter for producing, from a second mixed signal generated to have the first signal and second signal mixed, an estimated value of said first signal in the past as a first estimated value; a second subtracting section for removing said first estimated value from said second mixed signal to produce a second separated signal; and an output section for outputting a signal produced using said first separated signal and said second separated signal as said first signal.

To attain the object described above, another signal processing apparatus according to the present invention is characterized in comprising: a filter for, for each natural number m from 1 to n, producing, from first to n-th mixed signals generated to have n signals from a first signal to an n-th signal mixed, estimated values of the first to n-th signals in the past other than an m-th signal in the past; a subtracting section for removing said estimated values from said first to n-th mixed signals to produce first to n-th separated signals; and an output section for outputting a signal produced using said first to n-th separated signals as said first signal.

To attain the object described above, a signal processing program according to the present invention causes a computer to execute: for extracting a first signal from a first mixed signal and a second mixed signal in which the first signal and a second signal are mixed, processing of determining an estimated value of said first signal in the past as a first estimated value; processing of determining an estimated value of said second signal in the past as a second estimated value; processing of removing said second estimated value from said first mixed signal to produce a first separated signal; processing of removing said first estimated value from said second mixed signal to produce a second separated signal; and processing of outputting a signal produced using said first separated signal and said second separated signal as said first signal.

To attain the object described above, another signal processing program according to the present invention causes a computer to execute: for extracting a first signal using first to n-th mixed signals in which n signals from the first signal to an n-th signal are mixed, processing of, for each natural number m from 1 to n, determining estimated values of the first to n-th signals in the past other than an m-th signal in the past, and removing a sum of the estimated values from said m-th mixed signal to produce an m-th separated signal; and processing of producing a signal using said first to n-th separated signals, and outputting the signal as said first signal.

Advantageous Effects of Invention

According to the present invention, a desired signal can be extracted with higher accuracy from a mixed signal in which a plurality of signals are mixed.

DESCRIPTION OF EMBODIMENTS

Several embodiments of the present invention will now be described in detail with reference to the accompanying drawings by way of illustration. It should be noted that components described in the embodiments below are provided only by way of example, and it is not intended to limit the technical scope of the present invention thereto.

First Embodiment

Figure 1:
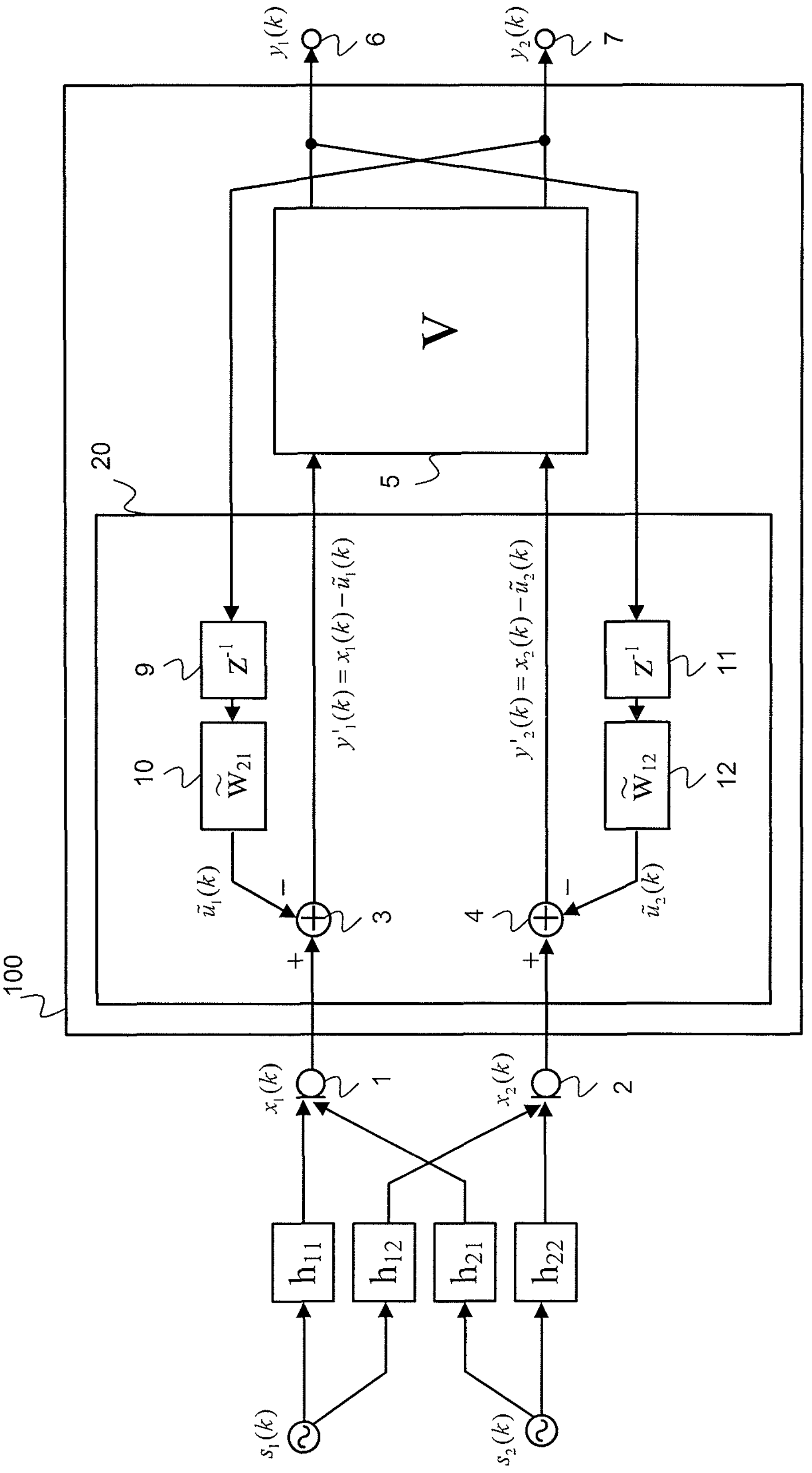
[FIG. 1] A block diagram showing a first embodiment of the present invention.

FIG. 1 is a block diagram showing a configuration of a signal processing apparatus 100 in accordance with a first embodiment of the present invention. The description here will address a case in which signals $s_1(k)$, $s_2(k)$ from two sources are separated as an example. A first mixed signal $x_1(k)$ output from a microphone 1 and a second mixed signal $x_2(k)$ output from a microphone 2 are supplied to a past component separating section 20 at subtractors 3, 4, respectively, that serve as first, second subtracting sections. A filter 10 supplies a first estimated value (EQ. (9)) of a component based on a second output signal in the past to the subtractor 3, and a filter 12 supplies a second estimated value (EQ. (10)) of a component based on a first output signal in the past to the subtractor 4. As used herein, "current" refers to a time at k, and "past" refers to a time preceding the time k.

[Equation 9]

$$\tilde{u}_1(k) = \sum_{j=1}^{N1-1} w_{21}(j)y_2(k-j) \tag{9}$$

[Equation 10]

$$\tilde{u}_2(k) = \sum_{j=1}^{N2-1} w_{12}(j)y_1(k-j) \tag{10}$$

In EQs. (9) and (10), the total sum on the right side is calculated starting with j=1, rather than j=0. That is, inputs to the filter 10 and filter 12 are $y_2(k-1)$, $y_2(k-2)$, . . . , $y_2(k-N1+1)$ and $y_1(k-1)$, $y_1(k-2)$, . . . , $y_1(k-N1+1)$.

The subtractor 3 subtracts an output of the filter 10 from the first mixed signal $x_1(k)$, produces a first separated signal $y'_1(k)$ as a result, and passes it to a current component separating section 5. The subtractor 4 subtracts an output of the filter 12 from the second mixed signal $x_2(k)$, produces a second separated signal $y'_2(k)$ as a result, and passes it to the current component separating section 5. The first separated signal $y'_1(k)$ and second separated signal $y'_2(k)$ are used to determine a first output signal and a second output signal as $y_1(k)$, $y_2(k)$, which are transmitted to output terminals 6 and 7, respectively. That is, the current component separating section 5 functions as an output section for outputting a signal produced using the first separated signal and second separated signal as the first signal from the signal source.

The second output signal $y_2(k)$ is supplied to a delay element 9. Similarly, the first output signal $y_1(k)$ is supplied to a delay element 11. The delay element 9 and delay element 11 delay the input first, second output signals by one sample, and supply them to the filter 10 and filter 12, respectively. That is, signals supplied to the filter 10 and filter 12 are the second output signal in the past and the first output signal in the past, respectively.

Figure 2:
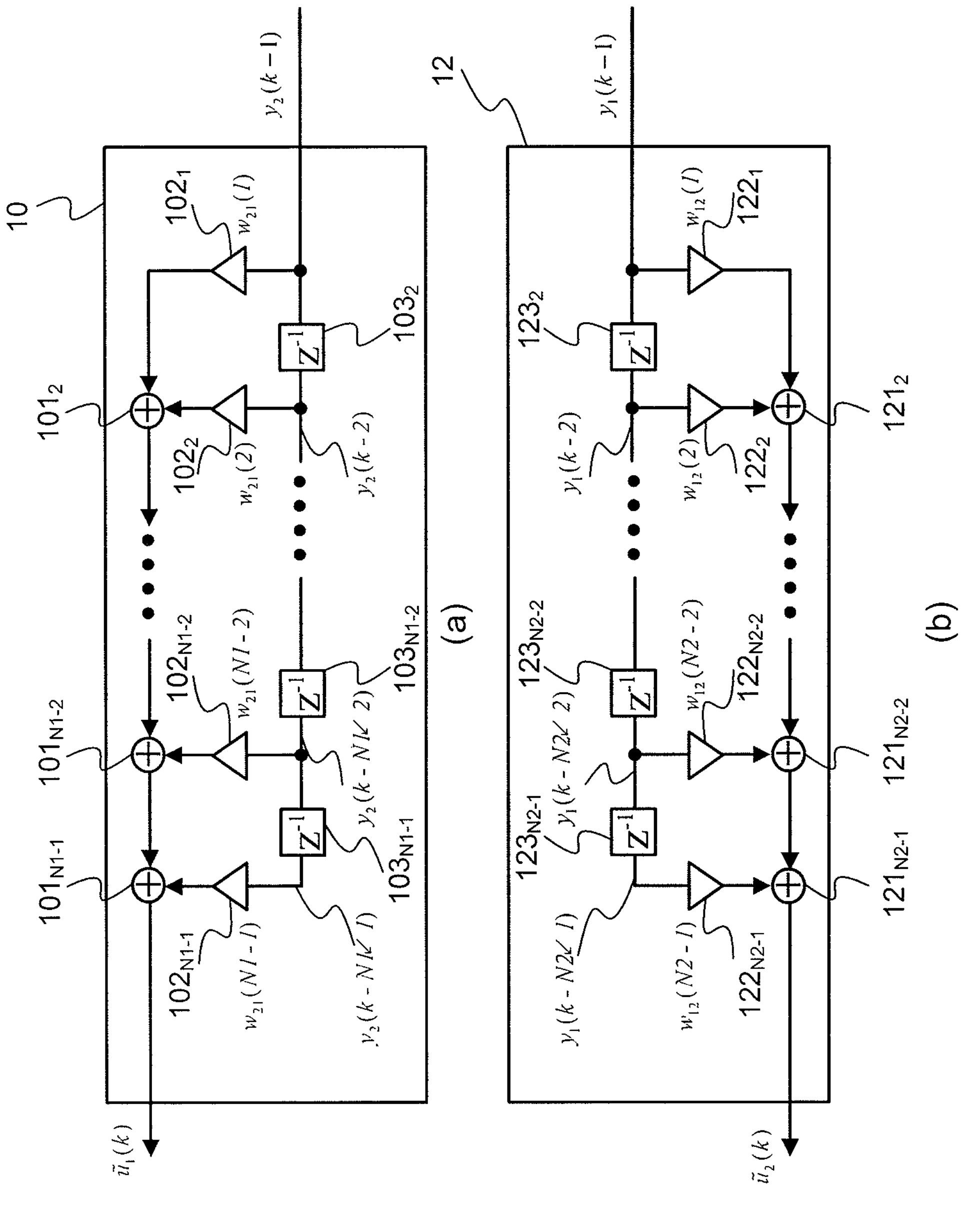
[FIG. 2] A block diagram showing a configuration of a filter included in FIG. 1.

FIG. 2(*a*) is an exemplary configuration of the filter 10. The filter 10 is supplied with a second output signal in the past $y_2(k-1)$. The second output signal in the past $y_2(k-1)$ is transmitted to a multiplier $\mathbf{102}_1$ and a delay element $\mathbf{103}_2$ in the filter 10. The multiplier $\mathbf{102}_1$ multiplies $y_2(k-1)$ by a factor of $w_{21}(1)$ to result in $w_{21}(1)\cdot y_2(k-1)$, which is transmitted to an adder $\mathbf{101}_2$. The delay element $\mathbf{103}_2$ delays $y_2(k-1)$ by one sample to result in $y_2(k-2)$, which is transmitted to a multiplier $\mathbf{102}_2$ and a delay element $\mathbf{103}_3$. The multiplier $\mathbf{102}_2$ multiplies $y_2(k-2)$ by a factor of $w_{21}(2)$ to result in $w_{21}(2)\cdot y_2(k-2)$, which is transmitted to an adder $\mathbf{101}_2$. The adder $\mathbf{101}_2$ adds $w_{21}(1)\cdot y_2(k-1)$ and $w_{21}(2)\cdot y_2(k-2)$, and transmits a result to an adder $\mathbf{101}_3$. Thereafter, such a process is repeated by a series of delay elements and multipliers and finally an adder $\mathbf{101}_{N1-1}$ outputs a total value as an estimated value represented by EQ. (9) given above. The method comprising the series of operations is known as convolution.

On the other hand, FIG. 2(*b*) shows an exemplary configuration of the filter 12. The configuration and operation of the filter 12 can be represented by merely replacing the input signal $y_2(k-1)$ with $y_1(k-1)$, and coefficients $w_{21}(j)$ (j=1, 2, . . . , N1−1) of the multipliers $\mathbf{122}_1$-$\mathbf{122}_{N2-1}$ with $w_{12}(j)$ (j=1, 2, . . . , N2−1). The other components and operations of the filter 12 are similar to those of the filter 10. Specifically, the filter 12 comprises delay elements $\mathbf{123}_2$-$\mathbf{103}_{N2-1}$ corresponding to the delay elements $\mathbf{103}_2$-$\mathbf{103}_{N1-1}$. The filter 12 also comprises multipliers $\mathbf{122}_1$-$\mathbf{122}_{N2-1}$ corresponding to the multipliers $\mathbf{102}_1$-$\mathbf{102}_{N1-1}$. It moreover comprises adders $\mathbf{121}_2$-$\mathbf{101}_{N2-1}$ corresponding to $\mathbf{101}_2$-$\mathbf{101}_{N1-1}$. Therefore, detailed description of each of them will be omitted here. It should be noted that the coefficients $w_{21}(j)$ (j=1, 2, . . . , N1−1), $w_{12}(j)$ (j=1, 2, . . . , N2−1) in the filters 10, 12 are constants, rather than functions of time k. Thus, when the transfer functions $H_{11}$, $H_{12}$, $H_{21}$, $H_{22}$ of the mixed signal generation process do not vary with time, the circuit and/or software for implementing the present embodiment can be significantly simplified.

The filter 10 and filter 12 are supplied with the second output signal in the past $y_2(k-1)$ and the first output signal in the past $y_1(k-1)$ delayed from the second output signal $y_2(k)$ and first output signal $y_1(k)$ by one sample by the delay element 9 and delay element 11, respectively. The filter 10 is therefore designed to calculate a component of the second signal $s_2(k)$ in the past that is assumed to be mixed with the first mixed signal $x_1(k)$, as the first estimated value (EQ. (9)). On the other hand, the filter 12 is designed to calculate a component of the first signal $s_1(k)$ in the past that is assumed to be mixed with the second mixed signal $x_2(k)$, as the second estimated value (EQ. (10)).

Figure 3:
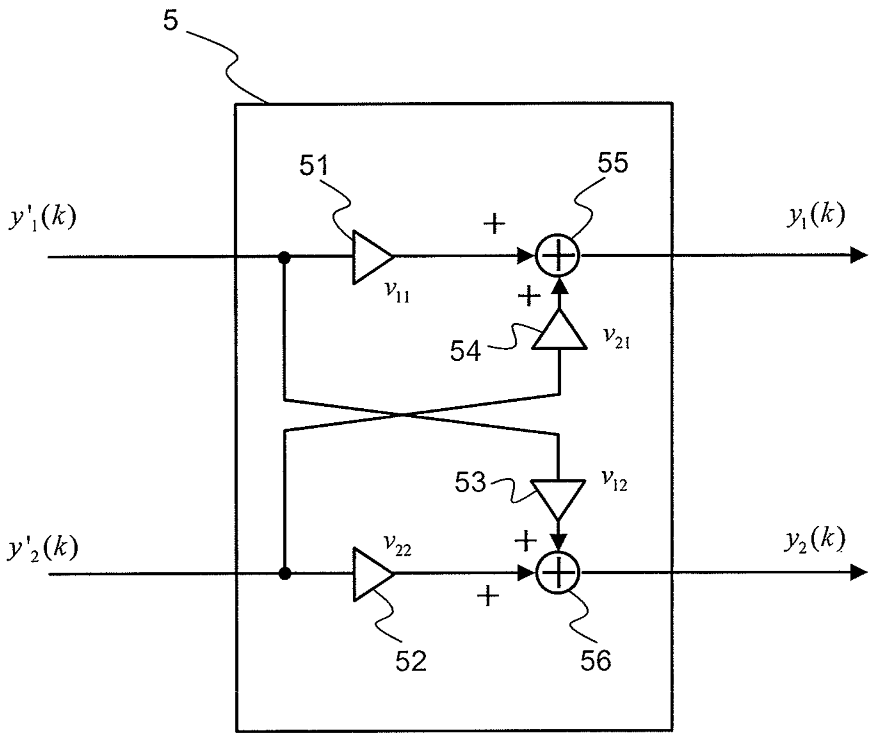
[FIG. 3] A block diagram showing a configuration of a current component separating section included in FIG. 1.

FIG. 3 is a diagram showing an internal configuration of the current component separating section 5. The output of the subtractor 3 is supplied to a multiplier 51 and a multiplier 53. The output of the subtractor 4 is supplied to a multiplier 52 and a multiplier 54. The multiplier 51 multiplies the input by a factor of $v_{11}$ and supplies the result to an adder 55. The multiplier 54 multiplies the input by a factor of $v_{21}$ and supplies the result to the adder 55. The adder 55 adds them together and outputs resulting $y_1(k)$ as follows:

[Equation 11]

$$y_2(k)=v_{12}\{x_1(k)-\tilde{u}_1(k)\}+v_{21}\{x_2(k)-\tilde{u}_2(k)\} \quad (11)$$

On the other hand, the multiplier 52 multiplies the input by a factor of $v_{22}$ and supplies the result to an adder 56. The multiplier 53 multiplies the input by a factor of $v_{12}$ and supplies the result to the adder 56. The adder 56 adds them together and outputs resulting $y_2(k)$ as follows:

[Equation 12]

$$y_2(k)=v_{12}\{x_1(k)-\tilde{u}_1(k)\}+v_{22}\{x_2(k)-\tilde{u}_2(k)\} \quad (12)$$

The results $y_1(k)$ and $y_2(k)$ are outputs of the current component separating section 5. EQ. (11) and EQ. (12) may be combined together as a matrix as given by EQ. (13).

[Equation 13]

$$\begin{bmatrix} y_1(k) \\ y_2(k) \end{bmatrix} = \begin{bmatrix} v_{11} & v_{21} \\ v_{12} & v_{22} \end{bmatrix} \begin{bmatrix} x_1(k)-\tilde{u}_1(k) \\ x_2(k)-\tilde{u}_2(k) \end{bmatrix} \quad (13)$$

Consequently, the past component separating section 20 in FIG. 1 comprising the subtractors 3, 4, filters 10, 12, and delay elements 9, 11 uses output signals in the past $y_1(k-j)$, $y_2(k-j)$ (j>0) to separate out past components present in the mixed signals. A result thereof is supplied to the current component separating section 5, which further separates a current component.

In other words, the past component separating section 20 uses the first mixed signal $x_1(k)$ and the second output signals in the past $y_2(k-1)$, $y_2(k-2)$, . . . , $y_2(k-N1+1)$ to produce the first separated signal $y'_1(k)$. It also uses the second mixed signal $x_2(k)$ and the first signals in the past $y_1(k-1)$, $y_1(k-2)$, . . . , $y_1(k-N1+1)$ to produce the second separated signal $y'_2(k)$.

The current component separating section 5 is supplied with the first separated signal $y'_1(k)$ and second separated signal $y'_2(k)$, and produces the first output signal $y_1(k)$ and second output signal $y_2(k)$. That is, the first separated signal and second separated signal are used to produce a first output signal. Particularly, an estimated value of a current (time k) second signal is determined as a third estimated value using the second separated signal, removes the third estimated value from the first separated signal to produce the first output signal. The third estimated value is a component of the current (time k) second signal estimated to be mixed with the first mixed signal.

Now a confirmation will be made that in the configuration shown in. FIG. 1, the first output signal $y_1(k)$ and second output signal $y_2(k)$ resulting from separation from the first mixed signal $x_1(k)$ and second mixed signal $x_2(k)$ correspond to the first signal $s_1(k)$ and second signal $s_2(k)$ before mixture.

Representing the right side of EQs. (5) and (6) by a term based on the current first output signal $y_1(k)$ and second output signal $y_2(k)$ separated from a term based on the other factors, the following equations are obtained:

[Equation 14]

$$y_1(k) = x_1(k) - w_{21}(0)y_2(k) - \sum_{j=1}^{N1-1} w_{21}(j)y_2(k-j) = x_1(k) - \tilde{u}_1(k) - w_{21}(0)y_2(k) \quad (14)$$

-continued

[Equation 15]

$$y_2(k)=x_2(k)-w_{12}(0)y_1(k)-\sum_{j=1}^{N2-1}w_{12}(j)y_1(k-j)=x_2(k)-\tilde{u}_2(k)-w_{12}(0)y_1(k) \quad (15)$$

Combining EQs. (14) and (15) together into a matrix format, EQ. (16) is obtained as follows:

[Equation 16]

$$\begin{bmatrix} y_1(k) \\ y_2(k) \end{bmatrix}=\begin{bmatrix} x_1(k)-\tilde{u}_1(k) \\ x_2(k)-\tilde{u}_2(k) \end{bmatrix}-\begin{bmatrix} w_{21}(0)y_2(k) \\ w_{12}(0)y_1(k) \end{bmatrix} \quad (16)$$

Rewriting this equation, EQ. (17) is obtained.

[Equation 17]

$$\begin{bmatrix} y_1(k) \\ y_2(k) \end{bmatrix}=\begin{bmatrix} x_1(k)-\tilde{u}_1(k) \\ x_2(k)-\tilde{u}_2(k) \end{bmatrix}-\begin{bmatrix} 0 & w_{21}(0) \\ w_{12}(0) & 0 \end{bmatrix}\begin{bmatrix} y_1(k) \\ y_2(k) \end{bmatrix} \quad (17)$$

Reorganization of the equation in terms of $y_1(k)$, $y_2(k)$ gives the following equation:

[Equation 18]

$$\begin{bmatrix} 1 & w_{21}(0) \\ w_{12}(0) & 1 \end{bmatrix}\begin{bmatrix} y_1(k) \\ y_2(k) \end{bmatrix}=\begin{bmatrix} x_1(k)-\tilde{u}_1(k) \\ x_2(k)-\tilde{u}_2(k) \end{bmatrix} \quad (18)$$

Solving the equation for $y_1(k)$, $y_2(k)$, the following equations are obtained:

[Equation 19]

$$\begin{bmatrix} y_1(k) \\ y_2(k) \end{bmatrix}=\begin{bmatrix} 1 & w_{21}(0) \\ w_{12}(0) & 1 \end{bmatrix}^{-1}\begin{bmatrix} x_1(k)-\tilde{u}_1(k) \\ x_2(k)-\tilde{u}_2(k) \end{bmatrix}=\frac{1}{\Delta_2}\begin{bmatrix} 1 & -w_{21}(0) \\ -w_{12}(0) & 1 \end{bmatrix}\begin{bmatrix} x_1(k)-\tilde{u}_1(k) \\ x_2(k)-\tilde{u}_2(k) \end{bmatrix} \quad (19)$$

[Equation 20]

$$\Delta_2=1-w_{12}(0)w_{21}(0) \quad (20)$$

Now a new square matrix v is defined as EQ. (21), and then, EQ. (19) can be rewritten into EQ. (22) below.

[Equation 21]

$$v=\begin{bmatrix} v_{11} & v_{12} \\ v_{21} & v_{22} \end{bmatrix}=\begin{bmatrix} \frac{1}{\Delta_2} & \frac{-w_{21}(0)}{\Delta_2} \\ \frac{-w_{12}(0)}{\Delta_2} & \frac{1}{\Delta_2} \end{bmatrix} \quad (21)$$

-continued

[Equation 22]

$$\begin{bmatrix} y_1(k) \\ y_2(k) \end{bmatrix}=\begin{bmatrix} v_{11} & v_{21} \\ v_{12} & v_{22} \end{bmatrix}\begin{bmatrix} x_1(k)-\tilde{u}_1(k) \\ x_2(k)-\tilde{u}_2(k) \end{bmatrix} \quad (22)$$

Since EQ. (22) is identical to EQ. (13), the first, second output signals can be obtained in the present embodiment as in EQs. (7) and (8). Specifically, under a condition that the following two equations stand, the first output signal $y_1(k)$ corresponds to the current first signal $s_1(k)$ generated from the first signal source and mixed with the first mixed signal.

$$w_{21}(j)=h_{21}(j)/h_{22}(j),\ j=0,1,2,\ldots,N1-1$$

$$w_{12}(j)=h_{12}(j)/h_{11}(j),\ j=0,1,2,\ldots,N2-1$$

As described above, since a condition that $w_{21}(0)=0$ and $w_{12}(0)=0$ is not imposed in this embodiment, signal separation can be achieved for arbitrary coefficients $w_{21}(0)$ and $w_{12}(0)$ with high accuracy. That is, a desired signal can be extracted with higher accuracy from a mixed signal in which a plurality of signals are mixed.

Second Embodiment

Figure 4:
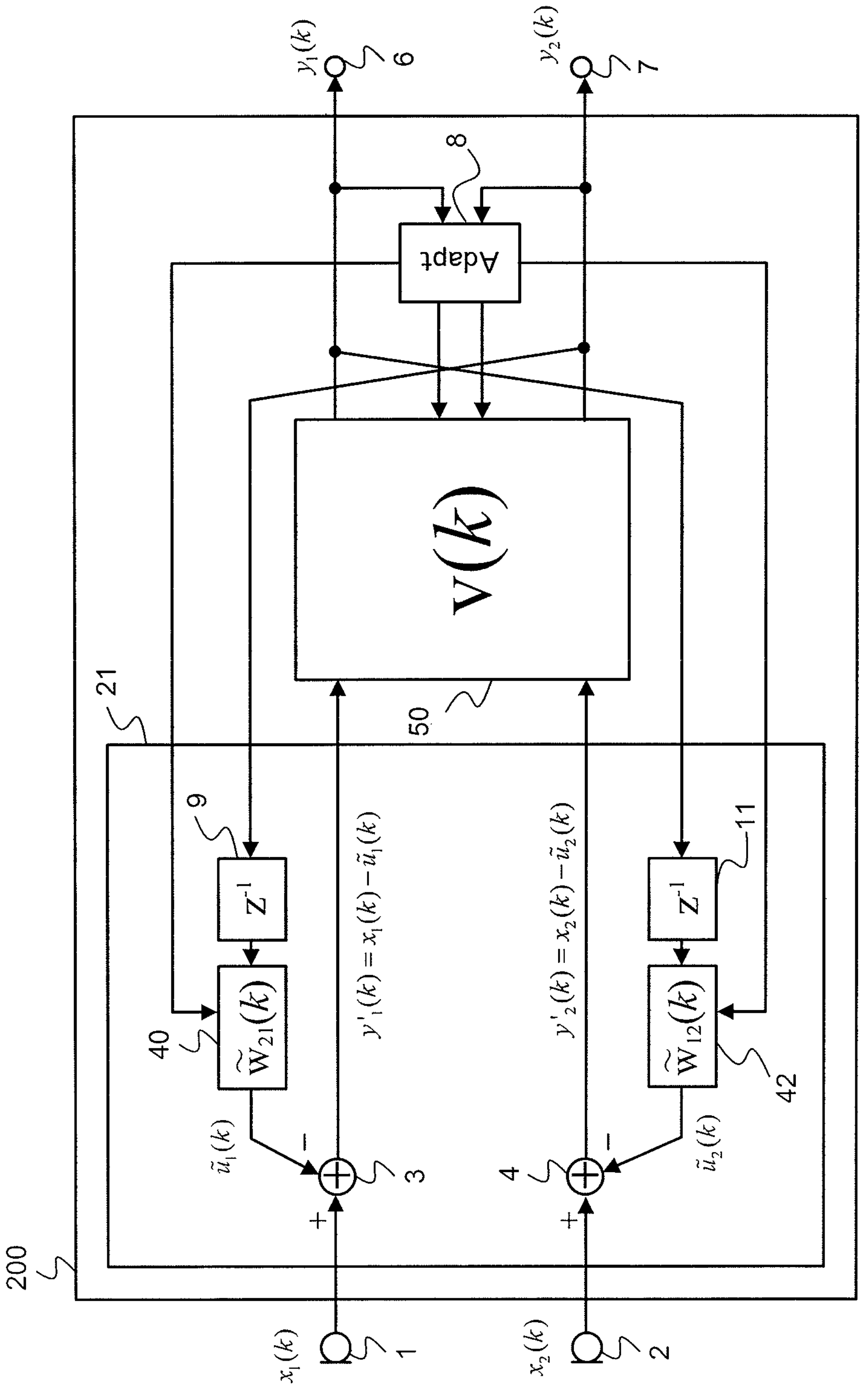
[FIG. 4] A block diagram showing a second embodiment of the present invention.

FIG. 4 is a block diagram showing a configuration of a signal processing apparatus 200 in accordance with a second embodiment of the present invention. The present embodiment has a similar configuration to that of the first embodiment, except that the past component separating section 20 is replaced with a past component separating section 21, the current component separating section 5 is replaced with a current component separating section 50, the filters 10, 12 are replaced with adaptive filters 40, 42, and a coefficient adaptation section 8 is added. Therefore, similar components are designated by similar reference numerals and explanation thereof will be omitted.

The coefficient adaptation section 8 produces coefficient updating information for updating coefficients used in the past component separating section 21 and current component separating section 50 in response to the output signals $y_1(k)$, $y_2(k)$. The produced coefficient updating information is supplied to the adaptive filters 40, 42, and current component separating section 50. The coefficient adaptation section 8 is capable of producing the coefficient updating information using a variety of coefficient adaptation algorithms. In a case that a normalized LMS algorithm is used, the coefficients $w_{21,j}(k)$, $w_{12,j}(k)$ are updated according to the equations below. It should be noted that while the coefficients $w_{21,j}$, $w_{12,j}$ have the same meaning as that of $w_{21}(j)$, $w_{21}(j)$ in the first embodiment, the designation as $w_{21,j}(k)$, $w_{12,j}(k)$ are used in the present embodiment because these coefficients are dependent upon time k.

[Equation 23]

$$w_{21,j}(k+1)=w_{21,j}(k)+\mu\frac{y_1(k)y_2(k-j)}{\delta+\sum_{l=0}^{N1-1}y_2^2(k-l)}=w_{21,j}(k)+\mu\frac{y_1(k)y_2(k-j)}{\sigma_{y^2}^2(k)} \quad (23)$$

-continued

[Equation 24]

$$\begin{aligned} w_{12,j}(k+1) &= w_{12,j}(k) + \mu\frac{y_2(k)y_1(k-j)}{\delta + \sum_{l=0}^{N2-1} y_1^2(k-l)} \\ &= w_{12,j}(k) + \mu\frac{y_2(k)y_1(k-j)}{\sigma_{y1}^2(k)} \end{aligned} \tag{24}$$

In these equations, the constant μ represents a step size, and $0<\mu<1$. Moreover, δ is a small constant for avoiding division by zero. The second term on the right side of EQ. (23) designates an amount of the coefficient to be updated, which is supplied to the current component separating section 50 when j=0, and to the adaptive filter 40 when j>0. Similarly, the second term on the right side of EQ. (24) is supplied to the current component separating section 50 when j=0, and to the adaptive filter 42 when j>0. That is, the coefficients of the adaptive filters 40, 42 are updated using a correlation (correlation value) between $y_1(k)$ and $y_2(k)$. Thus, a gradient coefficient updating algorithm, represented by the normalized LMS algorithm, is used to update the coefficient $w_{21,j}(k)$ of the filter 40 based on the output signal $y_1(k)$ and modify the coefficient $w_{12,j}(k)$ of the filter 42 based on the output signal $y_2(k)$, whereby output signals can be obtained with high accuracy even when the transfer functions $H_{11}$, $H_{12}$, $H_{21}$, $H_{22}$ of the mixed signal generation process vary with time depending upon a change in an external environment.

Figure 5:
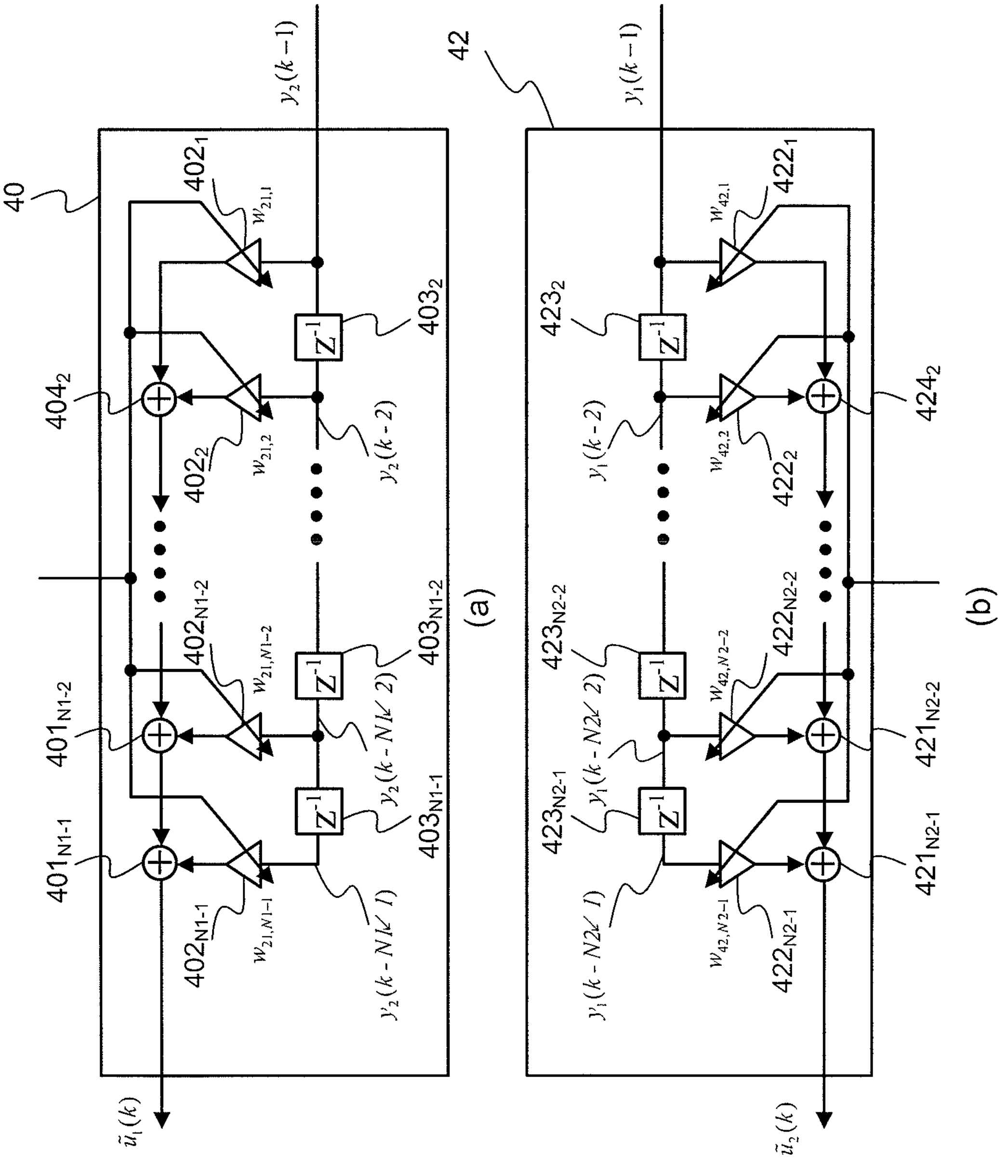
[FIG. 5] A block diagram showing a configuration of an adaptive filter included in FIG. 4.

FIG. 5 shows an exemplary configuration of the adaptive filter 40 and adaptive filter 42. The adaptive filter 40 and adaptive filter 42 in FIG. 5 are similar to the filters 10 and 12 in FIG. 2, except that the amount of the coefficient to be updated is supplied to multipliers $\mathbf{402}_1$, $\mathbf{402}_2$, . . . , $\mathbf{402}_{N1-1}$ and multipliers $\mathbf{422}_1$, $\mathbf{422}_2$, . . . , $\mathbf{422}_{N2-1}$. The amount of the coefficient to be updated $\mu y_1(k)y_2(k-j)/\sigma^2 y_2$ (j=1, 2, . . . , N1−1) supplied by the coefficient adaptation section 8 is supplied to the multipliers $\mathbf{402}_1$, $\mathbf{402}_2$, . . . , $\mathbf{402}_{N1-1}$ for use in coefficient updating according to EQ. (23). Similarly, the amount of the coefficient to be updated $\mu y_2(k)y_1(k-j)/\sigma^2 y_1$ (j=1, 2, . . . , N2−1) supplied by the coefficient adaptation section 8 is supplied to the multipliers $\mathbf{422}_1$, $\mathbf{422}_2$, . . . , $\mathbf{422}_{N2-1}$ for use in coefficient updating according to EQ. (24). Moreover, the amounts of coefficient updating $\mu y_1(k)y_2(k)/\sigma^2 y_2$ and $\mu y_2(k)y_1(k)/\sigma^2 y_1$ corresponding to j=0 are supplied to the current component separating section 50.

Figure 6:
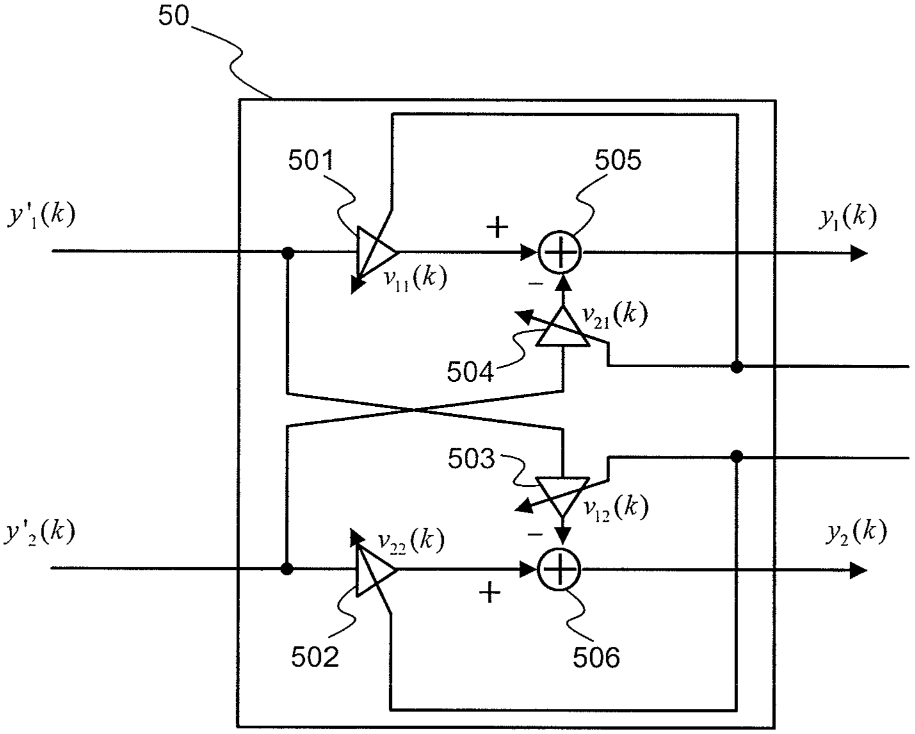
[FIG. 6] A block diagram showing a configuration of a current component separating section included in FIG. 4.

FIG. 6 is a diagram showing an exemplary configuration of the current component separating section 50. It is different from the current component separating section 5 shown in FIG. 3 in that the multipliers 501, 502, 503, 504 are supplied with coefficient updating information. The multipliers 501, 503 are supplied with $\mu y_1(k)y_2(k)/\sigma^2 y_2$, which is used to perform coefficient updating according to EQ. (23). Moreover, the multipliers 502, 503 are supplied with $\mu y_2(k)y_1(k)/\sigma^2 y_1$, which is used to perform coefficient updating according to EQ. (24).

The coefficient updating algorithm as applied herein may be one expressed by EQs. (25) and (26) below.

[Equation 25]

$$w_{21,j}(k+1)=w_{21,j}(k)+\mu\cdot f\{\alpha\cdot y_1(k)\}\cdot g\{\beta\cdot y_2(k-j)\} \tag{25}$$

[Equation 26]

$$w_{12,j}(k+1)=w_{12,j}(k)+\mu\cdot f\{\alpha\cdot y_2(k)\}\cdot g\{\beta\cdot y_1(k-j)\} \tag{26}$$

In these equations, $f\{\cdot\}$ and $g\{\cdot\}$ are odd functions, and α, β are constants. For $f\{\cdot\}$ and $g\{\cdot\}$, a sigmoid function, hyperbolic tangent (tan h) or the like may be used. Since the other operations including coefficient updating are similar to those using EQs. (23) and (24), details thereof will be omitted. Thus, the correlation between the plurality of output signals $y_1(k)$, $y_2(k)$ can be used to modify coefficients $w_{21,j}(k)$, $w_{12,j}(k)$ of the filters 40, 42, whereby output signals can be obtained with high accuracy even when the transfer functions $H_{11}$, $H_{12}$, $H_{21}$, $H_{22}$ of the mixed signal generation process vary with time depending upon a change in an external environment.

According to the present embodiment as described above, coefficients used in the adaptive filters 40, 42 and current component separating section 50 may be updated depending upon an output signal, which enables signal separation to be achieved with higher accuracy corresponding to a change in an external environment.

Third Embodiment

<Configuration as an Underlying Technique>

Figure 12:
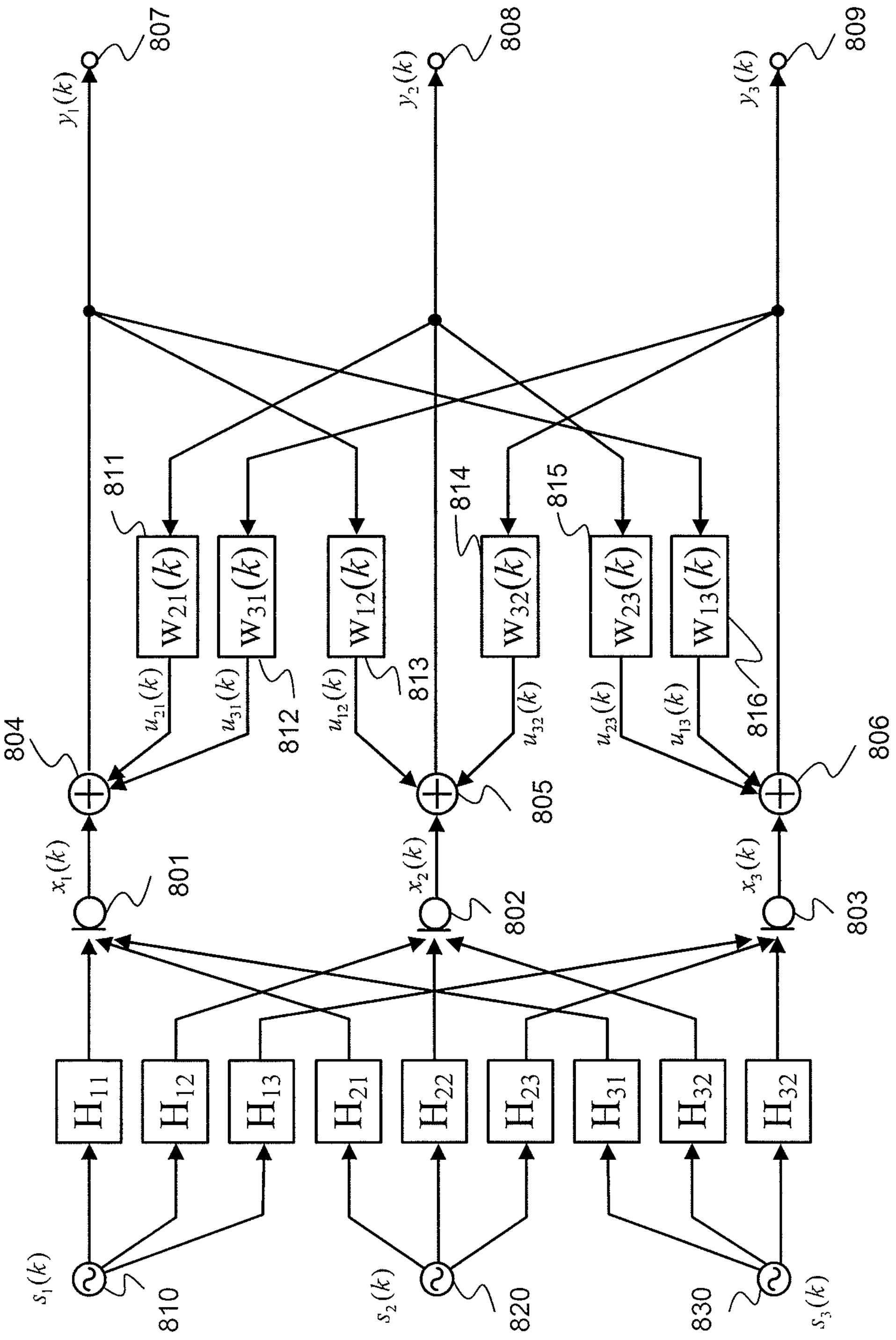
[FIG. 12] A block diagram showing a configuration of a feed-back blind signal separation system for three inputs.

Before explaining a third embodiment of the present invention, its underlying technique will be described with reference to FIG. 12. FIG. 12 shows the technique disclosed in NPL 2 extended to a number of microphones of three. This system comprises microphones 801-803, and output terminals 807-809. For an acoustic space from a first signal source 810 to the microphones 801-803, an impulse response $h_{11}$ (a transfer function $H_{11}$), an impulse response $h_{12}$ (a transfer function $H_{12}$), and an impulse response $h_{13}$ (a transfer function $H_{13}$) are defined. Similarly, for an acoustic space from a second signal source 820 to the microphones 801-803, an impulse response $h_{21}$ (a transfer function $H_{21}$), an impulse response $h_{22}$ (a transfer function $H_{22}$), and an impulse response $h_{23}$ (a transfer function $H_{23}$) are defined. Moreover, for an acoustic space from a third signal source 830 to the microphones 801-803, an impulse response $h_{31}$ (a transfer function $H_{31}$), an impulse response $h_{32}$ (a transfer function $H_{32}$), and an impulse response $h_{33}$ (a transfer function $H_{33}$) are defined.

On the other hand, the signal processing apparatus side comprises adaptive filters 811-816 corresponding to these impulse responses. The adaptive filter 811 supplies an output to a subtractor 804 in response to a second output $y_2(k)$. The adaptive filter 812 supplies an output to the subtractor 804 in response to a third output $y_3(k)$. The adaptive filter 813 supplies an output to a subtractor 805 in response to a first output $y_1(k)$. The adaptive filter 814 supplies an output to the subtractor 805 in response to the third output $y_3(k)$. The adaptive filter 815 supplies an output to a subtractor 806 in response to the second output $y_2(k)$. The adaptive filter 816 supplies an output to the subtractor 806 in response to the first output $y_1(k)$. Again, coefficients of these adaptive filters are updated as appropriate using the first to third outputs.

The microphone signals $x_1(k)$, $x_2(k)$, $x_3(k)$ are expressed by the following equations when these microphones 801-803 lie sufficiently close to the first, second, third signal sources 810, 820, 830.

[Equation 27]

$$x_1(k) = s_1(k) + \sum_{j=0}^{N1-1} h_{21}(j)s_2(k-j) + \sum_{j=0}^{N3-1} h_{31}(j)s_3(k-j) \tag{27}$$

-continued

[Equation 28]

$$x_2(k) = \sum_{j=0}^{N2-1} h_{12}(j)s_1(k-j) + s_2(k) + \sum_{j=0}^{N4-1} h_{32}(j)s_3(k-j) \quad (28)$$

[Equation 29]

$$x_3(k) = \sum_{j=0}^{N5-1} h_{13}(j)s_1(k-j) + \sum_{j=0}^{N6-1} h_{23}(j)s_2(k-j) + s_3(k) \quad (29)$$

Figure 10:
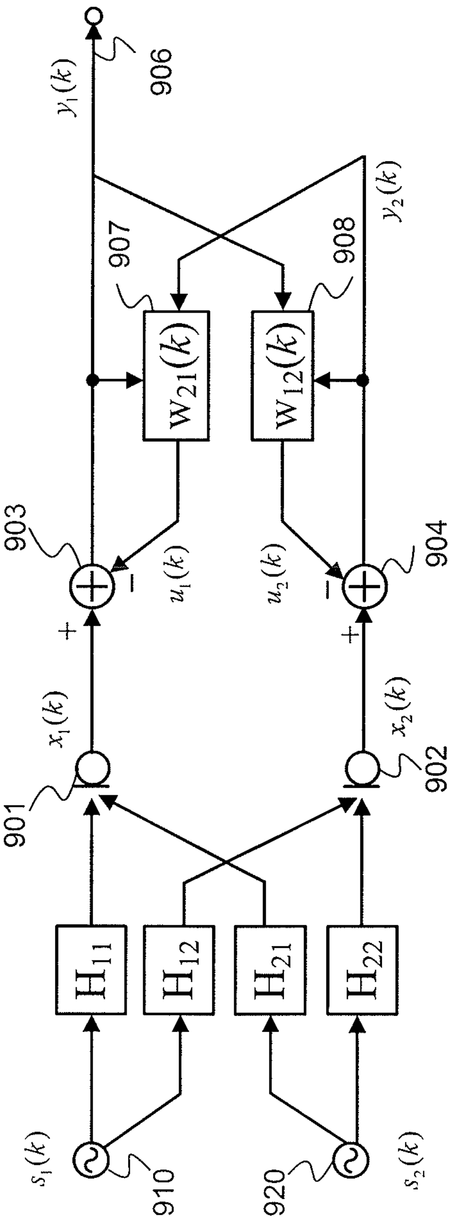
[FIG. 10] A block diagram showing a configuration of a conventional noise canceller.
Figure 11:
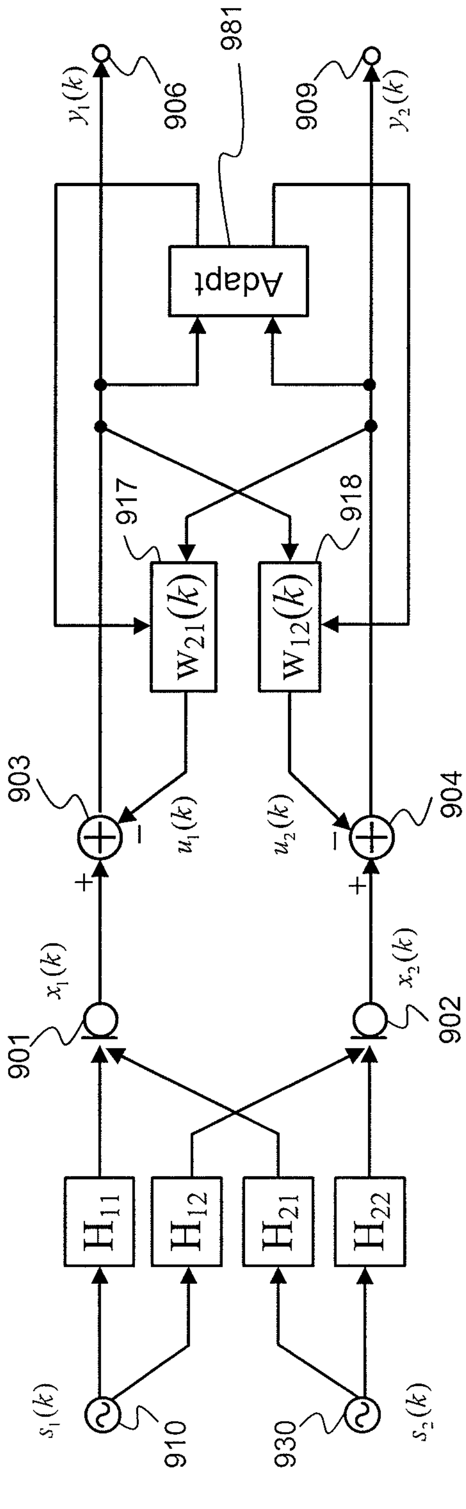
[FIG. 11] A block diagram showing a configuration of a conventional feed-back blind signal separation system for two inputs.

Similarly to FIG. 10, the output signals $y_1(k)$, $y_2(k)$, $y_3(k)$ are expressed by the following equations:

[Equation 30]

$$y_1(k) = s_1(k) + \sum_{j=0}^{N1-1} h_{21}(j)s_2(k-j) + \sum_{j=0}^{N3-1} h_{31}(j)s_3(k-j) - \sum_{j=0}^{N1-1} w_{21,j}(k)y_2(k-j) - \sum_{j=0}^{N3-1} w_{31,j}(k)y_3(k-j) \quad (30)$$

[Equation 31]

$$y_2(k) = s_2(k) + \sum_{j=0}^{N2-1} h_{12}(j)s_1(k-j) + \sum_{j=0}^{N4-1} h_{32}(j)s_3(k-j) - \sum_{j=0}^{N2-1} w_{21,j}(k)y_1(k-j) - \sum_{j=0}^{N4-1} w_{32,j}(k)y_3(k-j) \quad (31)$$

[Equation 32]

$$y_3(k) = s_3(k) + \sum_{j=0}^{N5-1} h_{13}(j)s_1(k-j) + \sum_{j=0}^{N6-1} h_{23}(j)s_2(k-j) - \sum_{j=0}^{N5-1} w_{13,j}(k)y_1(k-j) - \sum_{j=0}^{N6-1} w_{23,j}(k)y_2(k-j) \quad (32)$$

Therefore, the following conditions should be satisfied for signal separation.

$w_{21,j}(k)=h_{21}(j), j=0, 1, 2, \ldots, N1-1$ $w_{12,j}(k)=h_{12}(j), j=0, 1, 2, \ldots, N2-1$ $w_{31,j}(k)=h_{31}(j), j=0, 1, 2, \ldots, N3-1$ $w_{32,j}(k)=h_{32}(j), j=0, 1, 2, \ldots, N4-1$ $w_{13,j}(k)=h_{13}(j), j=0, 1, 2, \ldots, N5-1$ $w_{23,j}(k)=h_{23}(j), j=0, 1, 2, \ldots, N6-1$ Moreover, in a general case in which the condition that the microphones 801-803 lie sufficiently close to the first, second, third signal sources 810, 820, 830 is not satisfied, signal separation is achieved provided the following equations stand.

$w_{21,j}(k)=h_{21}(j)/h_{22}(j), j=0, 1, 2, \ldots, N1-1$ $w_{12,j}(k)=h_{12}(j)/h_{11}(j), j=0, 1, 2, \ldots, N2-1$ $w_{31,j}(k)=h_{31}(j)/h_{33}(j), j=0, 1, 2, \ldots, N3-1$ $w_{32,j}(k)=h_{32}(j)/h_{33}(j), j=0, 1, 2, \ldots, N4-1$ $w_{13,j}(k)=h_{13}(j)/h_{11}(j), j=0, 1, 2, \ldots, N5-1$ $w_{23,j}(k)=h_{23}(j)/h_{22}(j), j=0, 1, 2, \ldots, N6-1$

Configuration According to the Present Embodiment

To extract a desired signal from a mixed signal, the underlying technique described above also theoretically requires current values of other signals (signals other than the desired signal) contained in the mixed signal. On the other hand, to determine the current values of the "other signals," a current value of the desired signal is required, thus posing a problem of reciprocity. Accordingly, coefficients ($w_{12,0}(k)$, $w_{21,0}(k)$, $w_{31,0}(k)$, $w_{32,0}(k)$, $w_{13,0}(k)$, $w_{23,0}(k)$ in the example above) corresponding to the current values of other output signals are set to zero in the filter to ignore them. Therefore, a desired signal may not successfully be extracted with accuracy, leading to degradation of quality of extracted output signals.

Figure 7:
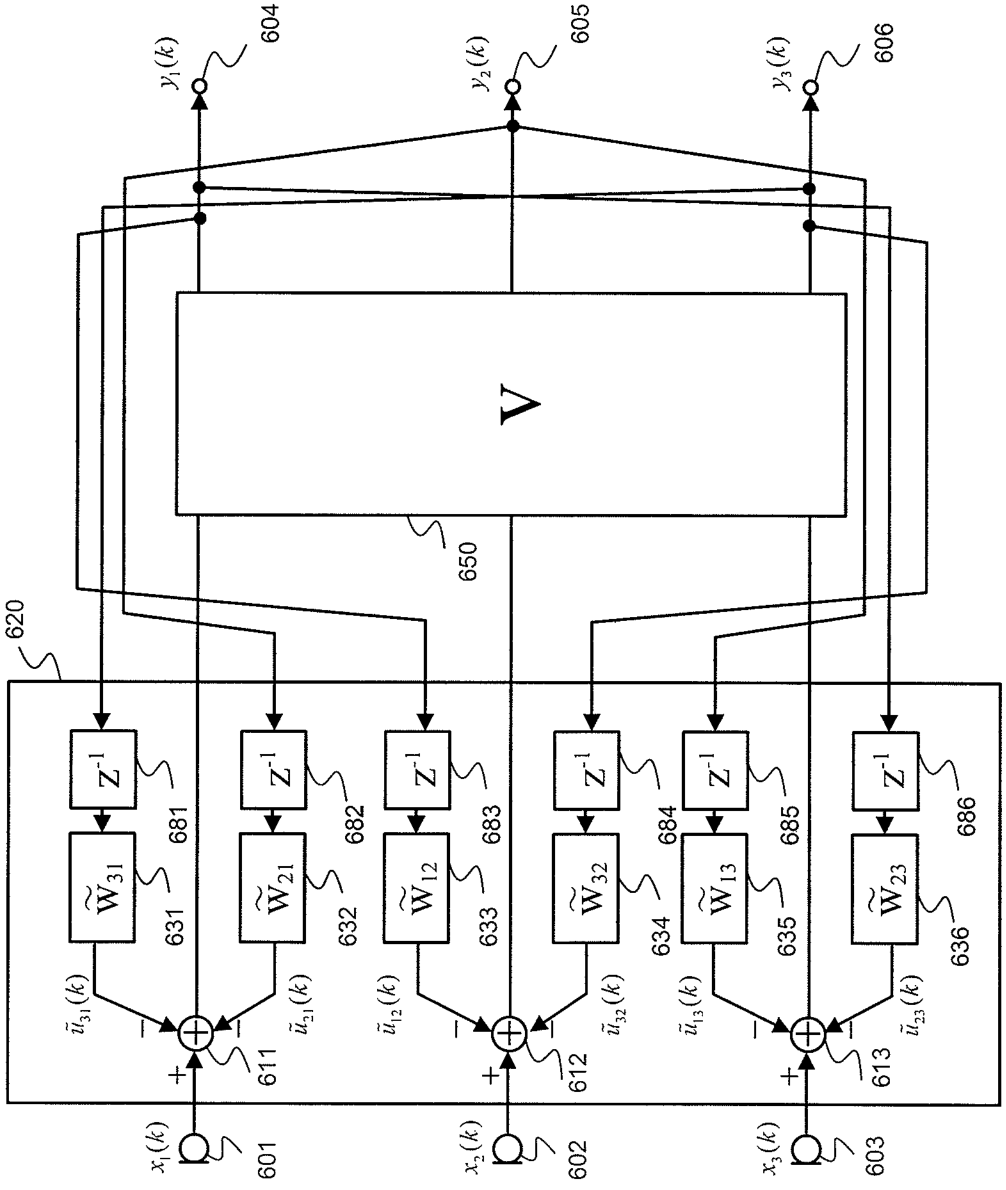
[FIG. 7] A block diagram showing a third embodiment of the present invention.

Now the third embodiment of the present invention will be described in contrast thereto with reference to a block diagram shown in FIG. 7. FIG. 7 corresponds to FIG. 1, added with a microphone to result in a total number of microphones of three. That is, it is a configuration for 3-channel signal separation. A difference from FIG. 1 is in that a filter, a delay element, a subtractor, and an output terminal are added, and the current component separating section 5 is replaced with a current component separating section 650.

The subtractor 611 is supplied with estimated values of components based on output signals in the past from filters 631, 632. The subtractor 612 is supplied with estimated values of components based on output signals in the past from filters 633, 634. The subtractor 613 is supplied with estimated values of components based on output signals in the past from filters 635, 636. These estimated values are given by EQ. (33) below.

[Equation 33]

$$\left.\begin{aligned}
\tilde{u}_{12}(k) &= \sum_{j=1}^{N1-1} w_{12,j}(k)y_1(k-j) \\
\tilde{u}_{21}(k) &= \sum_{j=1}^{N2-1} w_{21,j}(k)y_2(k-j) \\
\tilde{u}_{31}(k) &= \sum_{j=1}^{N3-1} w_{31,j}(k)y_3(k-j) \\
\tilde{u}_{32}(k) &= \sum_{j=1}^{N4-1} w_{32,j}(k)y_3(k-j) \\
\tilde{u}_{13}(k) &= \sum_{j=1}^{N5-1} w_{13,j}(k)y_1(k-j) \\
\tilde{u}_{23}(k) &= \sum_{j=1}^{N6-1} w_{23,j}(k)y_2(k-j)
\end{aligned}\right\} \quad (33)$$

The subtractors 611, 612, 613 subtract the estimated values as given by EQ. (33) from the first, second, third mixed signals $x_1(k)$, $x_2(k)$, $x_3(k)$ supplied by the microphones 601, 602, 603, and pass results thereof to the current component separating section 650. To clarify the operation of the current component separating section 650, the operation is analyzed, as in the case of two signal separation shown in FIG. 1.

Following the case shown in FIG. 1, the equation below is obtained.

[Equation 34]

$$\begin{bmatrix} y_1(k) \\ y_2(k) \\ y_3(k) \end{bmatrix} = \begin{bmatrix} x_1(k) - \tilde{u}_{21}(k) - \tilde{u}_{31}(k) \\ x_2(k) - \tilde{u}_{12}(k) - \tilde{u}_{32}(k) \\ x_3(k) - \tilde{u}_{13}(k) - \tilde{u}_{23}(k) \end{bmatrix} - \begin{bmatrix} w_{21,0}(k)y_2(k) + w_{31,0}(k)y_3(k) \\ w_{12,0}(k)y_1(k) + w_{32,0}(k)y_3(k) \\ w_{13,0}(k)y_1(k) + w_{23,0}(k)y_2(k) \end{bmatrix} \quad (34)$$

Rewriting this equation, the equation below is obtained.

[Equation 35]

$$\begin{bmatrix} y_1(k) \\ y_2(k) \\ y_3(k) \end{bmatrix} = \begin{bmatrix} x_1(k) - \tilde{u}_{21}(k) - \tilde{u}_{31}(k) \\ x_2(k) - \tilde{u}_{12}(k) - \tilde{u}_{32}(k) \\ x_3(k) - \tilde{u}_{13}(k) - \tilde{u}_{23}(k) \end{bmatrix} - \begin{bmatrix} 0 & w_{21,0}(k) & w_{31,0}(k) \\ w_{12,0}(k) & 0 & w_{32,0}(k) \\ w_{13,0}(k) & w_{23,0}(k) & 0 \end{bmatrix} \begin{bmatrix} y_1(k) \\ y_2(k) \\ y_3(k) \end{bmatrix} \quad (35)$$

Reorganization of the equation in terms of $y_1(k)$, $y_2(k)$, $y_3(k)$ gives the following equation:

[Equation 36]

$$\begin{bmatrix} 1 & w_{21,0}(k) & w_{31,0}(k) \\ w_{12,0}(k) & 1 & w_{32,0}(k) \\ w_{13,0}(k) & w_{23,0}(k) & 1 \end{bmatrix} \begin{bmatrix} y_1(k) \\ y_2(k) \\ y_3(k) \end{bmatrix} = \begin{bmatrix} x_1(k) - \tilde{u}_{21}(k) - \tilde{u}_{31}(k) \\ x_2(k) - \tilde{u}_{12}(k) - \tilde{u}_{32}(k) \\ x_3(k) - \tilde{u}_{13}(k) - \tilde{u}_{23}(k) \end{bmatrix} \quad (36)$$

Solving the equation for $y_1(k)$, $y_2(k)$, $y_3(k)$, the following equations are obtained:

[Equation 37]

$$\begin{aligned} \begin{bmatrix} y_1(k) \\ y_2(k) \\ y_3(k) \end{bmatrix} &= \begin{bmatrix} 1 & w_{21,0}(k) & w_{31,0}(k) \\ w_{12,0}(k) & 1 & w_{32,0}(k) \\ w_{13,0}(k) & w_{23,0}(k) & 1 \end{bmatrix}^{-1} \begin{bmatrix} x_1(k) - \tilde{u}_{21}(k) - \tilde{u}_{31}(k) \\ x_2(k) - \tilde{u}_{12}(k) - \tilde{u}_{32}(k) \\ x_3(k) - \tilde{u}_{13}(k) - \tilde{u}_{23}(k) \end{bmatrix} \\ &= \frac{1}{\Delta_3} \begin{bmatrix} 1 - w_{32,0}(k)w_{23,0}(k) & w_{31,0}(k)w_{23,0}(k) - w_{21,0}(k) & w_{21,0}(k)w_{32,0}(k) - w_{31,0}(k) \\ w_{32,0}(k)w_{13,0}(k) - w_{12,0}(k) & 1 - w_{31,0}(k)w_{13,0}(k) & w_{31,0}(k)w_{12,0}(k) - w_{32,0}(k) \\ w_{12,0}(k)w_{23,0}(k) - w_{13,0}(k) & w_{21,0}(k)w_{13,0}(k) - w_{23,0}(k) & 1 - w_{21,0}(k)w_{12,0}(k) \end{bmatrix} \\ &\quad \begin{bmatrix} x_1(k) - \tilde{u}_{21}(k) - \tilde{u}_{31}(k) \\ x_2(k) - \tilde{u}_{12}(k) - \tilde{u}_{32}(k) \\ x_3(k) - \tilde{u}_{13}(k) - \tilde{u}_{23}(k) \end{bmatrix} \end{aligned} \quad (37)$$

[Equation 38]

$$\Delta_3 = 1 + w_{21,0}(k)w_{32,0}(k)w_{13,0}(k) + w_{31,0}(k)w_{12,0}(k)w_{23,0}(k) - w_{31,0}(k)w_{13,0}(k) - w_{32,0}(k)w_{23,0}(k) - w_{21,0}(k)w_{12,0}(k) \quad (38)$$

Now a new square matrix $v_3(k)$ is defined as EQ. (39), and then, EQ. (40) is obtained.

[Equation 39]

$$\begin{aligned} v_3(k) &= \begin{bmatrix} v_{11}(k) & v_{12}(k) & v_{13}(k) \\ v_{21}(k) & v_{22}(k) & v_{23}(k) \\ v_{31}(k) & v_{32}(k) & v_{33}(k) \end{bmatrix} \\ &= \begin{bmatrix} \{1 - w_{32,0}(k)w_{23,0}(k)\}/\Delta_3 & \{w_{31,0}(k)w_{23,0}(k) - w_{21,0}(k)\}/\Delta_3 & \{w_{21,0}(k)w_{32,0}(k) - w_{31,0}(k)\}/\Delta_3 \\ \{w_{32,0}(k)w_{13,0}(k) - w_{12,0}(k)\}/\Delta_3 & \{1 - w_{31,0}(k)w_{13,0}(k)\}/\Delta_3 & \{w_{31,0}(k)w_{12,0}(k) - w_{32,0}(k)/\Delta_3 \\ \{w_{12,0}(k)w_{23,0}(k) - w_{13,0}(k)\}\Delta_3 & \{w_{21,0}(k)w_{13,0}(k) - w_{23,0}(k)\}/\Delta_3 & \{1 - w_{21,0}(k)w_{12,0}(k)\}/\Delta_3 \end{bmatrix} \end{aligned} \quad (39)$$

[Equation 40]

$$\begin{bmatrix} y_1(k) \\ y_2(k) \\ y_3(k) \end{bmatrix} = \begin{bmatrix} v_{11}(k) & v_{12}(k) & v_{13}(k) \\ v_{21}(k) & v_{22}(k) & v_{23}(k) \\ v_{31}(k) & v_{32}(k) & v_{33}(k) \end{bmatrix} \begin{bmatrix} x_1(k) - \tilde{u}_{21}(k) - \tilde{u}_{31}(k) \\ x_2(k) - \tilde{u}_{12}(k) - \tilde{u}_{32}(k) \\ x_3(k) - \tilde{u}_{13}(k) - \tilde{u}_{23}(k) \end{bmatrix} \quad (40)$$

That is, the current component separating section 650 executes linear combination calculation as given by EQ. 40 in response to the outputs of the subtractors 611, 612, 613, and transmits a result thereof to output terminals 604, 605, 606 as output signals $y_1(k)$, $y_2(k)$, $y_3(k)$. The output signals $y_1(k)$, $y_2(k)$, $y_3(k)$ are also transmitted to delay elements 681, 682, 683, 684, 685, 686.

The thus-determined first output signal $y_1(k)$, second output signal $y_2(k)$, third output signal $y_3(k)$ are represented by EQs. (30)-(32). That is, under a condition that the following six equations stand, the first output signal $y_1(k)$ corresponds to the current first signal $s_1(k)$ generated from the first signal source and mixed with the first mixed signal.

$$w_{21,j}(k)=h_{21}(j)/h_{22}(j), j=0, 1, 2, \ldots, N-1$$

$$w_{12,j}(k)=h_{12}(j)/h_{11}(j), j=0, 1, 2, \ldots, N2-1$$

$$w_{31,j}(k)=h_{31}(j)/h_{33}(j), j=0, 1, 2, \ldots, N3-1$$

$$w_{32,j}(k)=h_{32}(j)/h_{33}(j), j=0, 1, 2, \ldots, N4-1$$

$$w_{13,j}(k)=h_{13}(j)/h_{11}(j), j=0, 1, 2, \ldots, N5-1$$

$$w_{23,j}(k)=h_{23}(j)/h_{22}(j), j=0, 1, 2, \ldots, N6-1$$

In this embodiment, coefficients ($w_{12,0}(k)$, $w_{21,0}(k)$, $w_{31,0}(k)$, $w_{32,0}(k)$, $w_{13,0}(k)$, $w_{23,0}(k)$ in the example above) corresponding to the current values of other output signals do not need to be set to zero in the filter. Therefore, signal separation can be achieved for arbitrary coefficients with high accuracy. That is, a desired signal can be extracted with higher accuracy from a mixed signal in which a plurality of signals are mixed.

Fourth Embodiment

Figure 8:
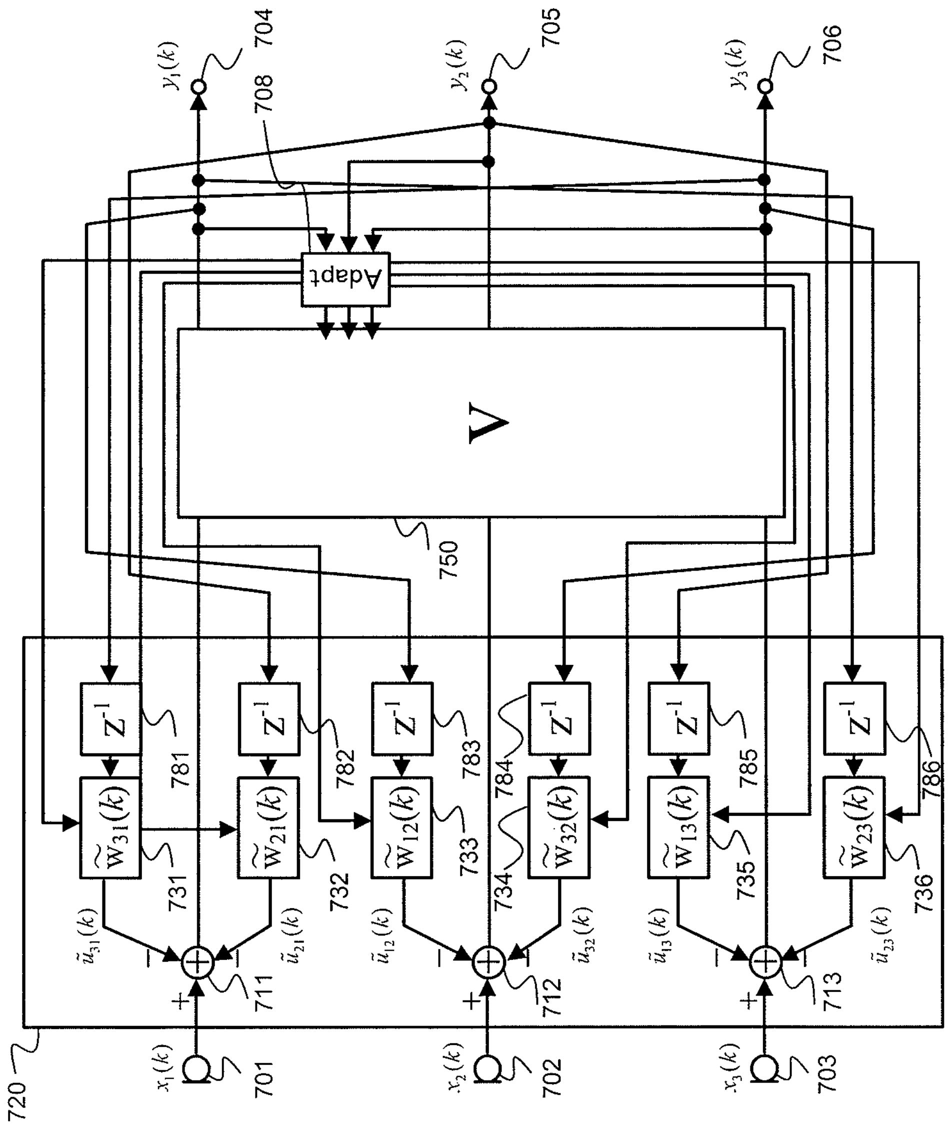
[FIG. 8] A block diagram showing a fourth embodiment of the present invention.

FIG. 8 is a block diagram showing a fourth embodiment of the present invention. A relationship between FIGS. 7 and 8 corresponds to the relationship between FIGS. 1 and 4 except that the number of signals to be separated is modified from two to three. As a coefficient updating algorithm, a normalized LMS algorithm or an algorithm as given by EQs. (25) and (26) can be used. Therefore, further details will be omitted.

Fifth Embodiment

While the preceding description addresses a case in which a mixed signal comprised of two signals is separated in FIGS. 1 and 4, and a case in which a mixed signal comprised of three signals is separated in FIGS. 7 and 8, a more general case in which a mixed signal comprised of n signals is separated can be similarly considered. In a case that the number of microphones and the number of signal sources are both n, first to n-th output signals $y_1(k)$, $y_2(k)$, $y_3(k)$, . . . , $y_n(k)$ are given by the following equation:

[Equation 41]

$$\begin{bmatrix} y_1(k) \\ y_2(k) \\ \vdots \\ y_n(k) \end{bmatrix} = \begin{bmatrix} 1 & w_{21,0}(k) & \ldots & w_{n1,0}(k) \\ w_{12,0}(k) & 1 & \ldots & w_{n2,0}(k) \\ \vdots & \vdots & 1 & \vdots \\ w_{1n,0}(k) & w_{2n,0}(k) & \ldots & 1 \end{bmatrix}^{-1} \begin{bmatrix} x_1(k) - \sum_{\substack{j=1 \\ j\neq 1}}^{n} \tilde{u}_{j1}(k) \\ x_2(k) - \sum_{\substack{j=1 \\ j\neq 2}}^{n} \tilde{u}_{j2}(k) \\ \vdots \\ x_n(k) - \sum_{\substack{j=1 \\ j\neq n}}^{n} \tilde{u}_{jn}(k) \end{bmatrix} \tag{41}$$

An inverse matrix $A^{-1}$ of an n-th order square matrix A is given by the following equation:

[Equation 42]

$$A^{-1} = \frac{1}{\Delta_n} B^T \tag{42}$$

In this equation, $B^T$ is a transpose of B, which is a cofactor of A. $\Delta_n$ is a determinant of A, |A|, and a square matrix B is given by the following equation:

[Equation 43]

$$B = \begin{bmatrix} b_{11} & b_{21} & \ldots & b_{n1} \\ b_{12} & b_{22} & \ldots & b_{n2} \\ \vdots & \vdots & \ddots & \vdots \\ b_{1n} & b_{2n} & \ldots & b_{nn} \end{bmatrix} \tag{43}$$

[Equation 44]

$$b_{ij} = (-1)^{p+q} |b_{pq}|_{p\neq i,q\neq j}| \tag{44}$$

That is, for an arbitrary number n of signals, a column vector on the right side of EQ. (41) is determined as a first separated signal in which components generated by output signals in the past are separated. By applying thereto the inverse matrix on the right side of EQ. (41) from the left to determine a current output signal, signal separation can be achieved without explicitly using the current output signal. It should be noted that when separating a mixed signal containing n signals, it is necessary to provide n(n−1) filters for separating the past components.

Specifically, for a natural number m from one to n, estimated values of first to n-th signals in the past other than an m-th signal in the past are determined, the estimated values are removed from an m-th mixed signal to produce an m-th separated signal, and a signal produced using first to n-th separated signals is output as a first signal. Thus, first to n-th mixed signals in which n signals from the first signal to n-th signal are mixed can be used to extract the first signal. That is, by making a configuration as in the present embodiment, it is possible to separate a desired signal with high accuracy even from a mixed signal in which an arbitrary number of signals are mixed.

Another Embodiment

According to the first to fifth embodiments in the preceding description, a plurality of mixed signals are wholly processed to separate a signal. However, a process involving dividing a mixed signal into a plurality of sub-band mixed signals, processing the plurality of sub-band mixed signals to determine a plurality of sub-band output signals, and combining the plurality of sub-band output signals to determine an output signal may be contemplated. That is, any one of the embodiments described earlier may be applied after dividing a mixed signal into sub-bands to produce sub-band mixed signals, and a resulting plurality of sub-band output signals may be combined to determine an output signal. By applying sub-band processing, the number of signals can be decreased to reduce the amount of computation. Moreover, since convolution in a time domain (filtering) can be expressed by a simple multiplication, it is possible to reduce the amount of computation. Furthermore, since a sub-band signal spectrum is more planar to be closer to a white signal than a full-band signal spectrum, performance of separation is improved.

In such sub-band division processing, time-to-frequency transform such as a band division filter bank, Fourier transform, or cosine transform may be applied. In sub-band synthesis, frequency-to-time transform such as a frequency band synthesis filter bank, inverse Fourier transformation, or inverse cosine transform may be applied. Furthermore, in the time-to-frequency transform and frequency-to-time transform, a window function may be applied to reduce discontinuity at a block border. Consequently, prevention of unusual noises and calculation of accurate sub-band signals become possible.

In addition to the embodiments described above, any arbitrary combination thereof is encompassed by the scope of the present invention. Moreover, the present invention may be applied either to a system comprising a plurality of pieces of hardware or a single-unit apparatus. Furthermore, the present invention is applicable to a case in which a signal processing program in software implementing the function of any embodiment is supplied directly or remotely to a system or an apparatus. Therefore, programs installed in a computer, media for storing the programs, and WWW servers allowing download of the programs to implement the function of the present invention in the computer are encompassed by the scope of the present invention.

Figure 9:
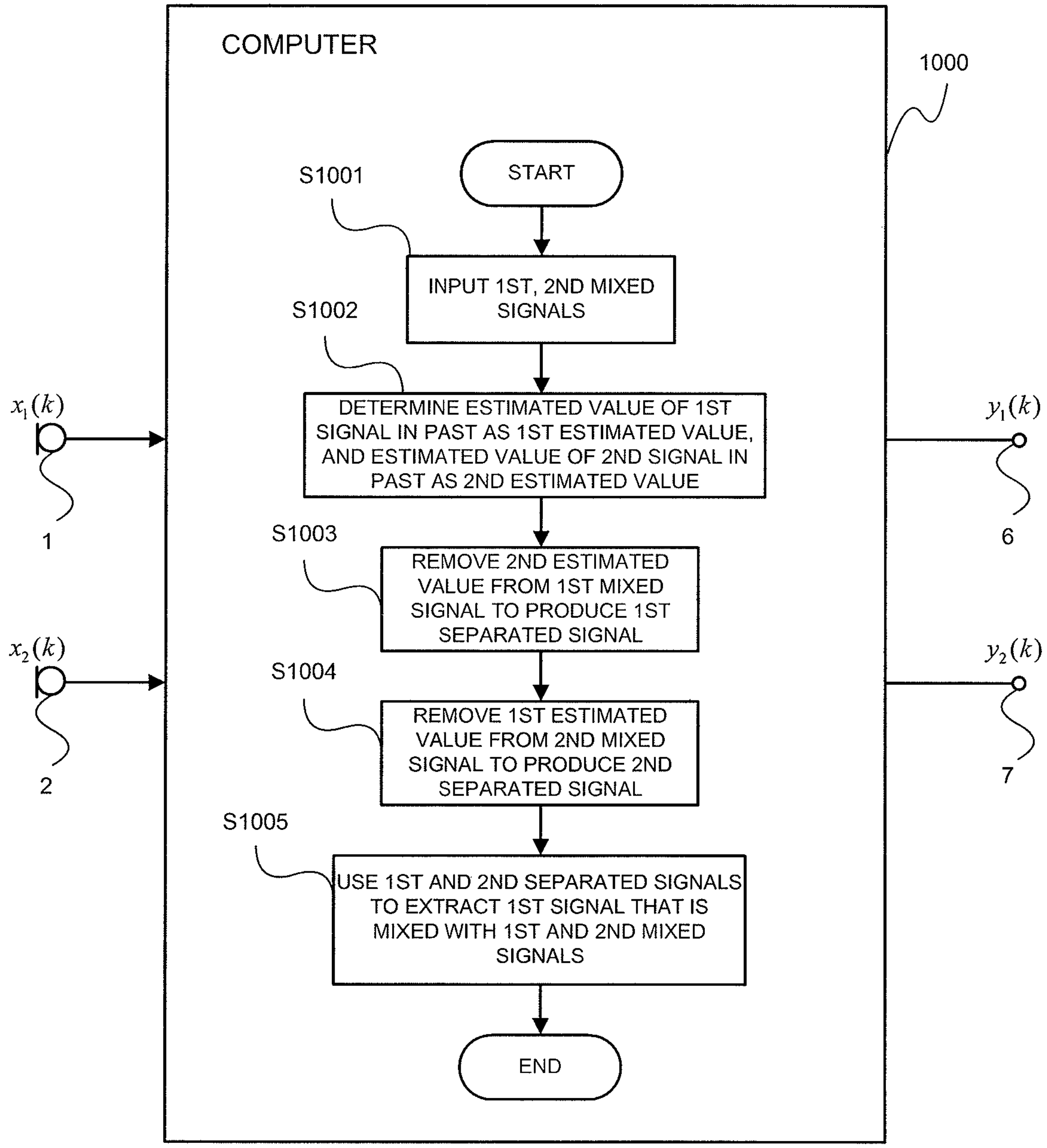
[FIG. 9] A block diagram showing another embodiment of the present invention.

FIG. 9 shows a flow chart illustrating software for implementing the function of the present invention, representing that the flow chart is executed by a computer. FIG. 9 shows a configuration in which a computer 1000 applies the signal processing described regarding the first to fourth embodiments above in response to mixed signals $x_1(k)$, $x_2(k)$ to determine output signals $y_1(k)$, $y_2(k)$. Specifically, a first mixed signal and a second mixed signal in which a first signal and a second signal are mixed are first input (S1001). Next, an estimated value of the first signal in the past is determined as a first estimated value, and an estimated value of the second signal in the past is determined as a second estimated value (S1002). Next, the second estimated value is removed from the first mixed signal to produce a first separated signal (S1003). Next, the first estimated value is removed from the second mixed signal to produce a second separated signal (S1004). Furthermore, the first separated signal and second separated signal are used to produce a first output signal (S1005). The first output signal is equal to the original first signal under a certain condition. While the number of input mixed signals is two in FIG. 9, this is merely an example and the number may be an arbitrary integer n.

While the present invention has been described with reference to embodiments and examples in the preceding description, the present invention is not necessarily limited to the embodiments and examples described above, and several modifications may be made within a scope of the technical idea thereof.

The present application claims priority based on Japanese Patent Application No. 2009-229509 filed on Oct. 1, 2009, disclosure of which is incorporated herein as its entirety.

REFERENCE SIGNS LIST

1, 2, 601, 602, 603, Input terminals (microphones)
3, 4, 611, 612, 613 Subtractors
20, 21, 620 Past component separating section
5, 500 Current component separating section
6, 7, 604, 605, 606 Output terminals
8, 708 Coefficient adaptation section
9, 11, $\mathbf{103_2\text{-}103_{N1-1}}$, $\mathbf{123_2\text{-}123_{N2-1}}$, 403, 423, 681-686 Delay elements
10, 12, 631-636 Filters
51-54, $\mathbf{102_1\text{-}102_{N1-1}}$, $\mathbf{122_1\text{-}122_{N2-1}}$, 501-504 Multipliers
55, 56, $\mathbf{101_2\text{-}101_{N1-1}}$, $\mathbf{121_2\text{-}121_{N2-1}}$ Adders
40, 42, 731-736 Adaptive filters
1000 Computer

The invention claimed is:

1. A signal processing method of extracting a first signal from a first mixed signal and a second mixed signal in which the first signal and a second signal are mixed, comprising:
determining an estimated value of said first signal in the past as a first estimated value;
determining an estimated value of said second signal in the past as a second estimated value;
removing said second estimated value from said first mixed signal to produce a first separated signal;
removing said first estimated value from said second mixed signal to produce a second separated signal; and
outputting a changing mixture, of said first separated signal and said second separated signal as said first signal, which is controlled by a mixture of said first separated signal and said second separated signal.

2. A signal processing method according to claim 1, wherein
said first estimated value is a component of the first signal in the past that is estimated to be mixed with said second mixed signal, and
said second estimated value is a component of the second signal in the past that is estimated to be mixed with said first mixed signal.

3. A signal processing method according to claim 1, comprising determining an estimated value of said second signal at the current time as a third estimated value using said second separated signal, and removing said third estimated value from said first separated signal to produce said signal.

4. A signal processing method according to claim 3, wherein said third estimated value is a component of said second signal at the current time that is estimated to be mixed with into said first mixed signal.

5. A signal processing method according to claim 1, wherein said first and second mixed signals are sub-band mixed signals resulting from sub-band division.

6. A signal processing method according to claim 1, comprising:
in determining said first estimated value, convoluting said first signal in the past with a first group of coefficients;
in determining said second estimated value, convoluting said second signal in the past with a second group of coefficients;
updating said first group of coefficients using said second signal in the past; and updating said second group of coefficients using said first signal in the past.

7. A signal processing method according to claim 1, comprising:

in determining said first estimated value, convoluting said first signal in the past with a first group of coefficients;

in determining said second estimated value, convoluting said second signal in the past with a second group of coefficients;

updating said first and second groups of coefficients using a value of correlation between said first signal in the past and said second signal in the past.

8. A signal processing method of extracting a first signal using first to n-th mixed signals in which n signals from the first signal to an n-th signal are mixed, comprising:

for each natural number m from 1 to n, determining estimated values of the first to n-th signals in the past other than an m-th signal in the past, and removing the estimated values from an m-th mixed signal to produce an m-th separated signal; and producing a changing mixture of said first to n-th separated signals, and outputting the signal as said first signal, wherein the changing mixture is controlled by a mixture of said first n-th separated signals.

9. A signal processing method according to claim 8, wherein said estimated values are components of the first to n-th signals in the past other than the m-th signal in the past that are estimated to be mixed with said m-th mixed signal.

10. A signal processing method according to claim 8, comprising determining estimated values of said second to n-th signals at the current time using said first to n-th separated signals, and removing the estimated values of said second to n-th signals at the current time from said first separated signal to produce said first signal.

11. A signal processing method according to claim 8, wherein the estimated values of said second to n-th signals at the current time are components of said second to n-th signals at the current time that are estimated to be mixed with said first mixed signal.

12. A signal processing method according to claim 8, wherein said first to n-th mixed signals are sub-band mixed signals resulting from sub-band division.

13. A signal processing method according to claim 8, comprising:

in determining said estimated values, convoluting said first to n-th signals in the past other than the m-th signal in the past with a plurality of coefficients; and updating said plurality of coefficients using said first signal in the past.

14. A signal processing method according to claim 8, comprising:

in determining said estimated values, convoluting said first to n-th signals in the past other than the m-th signal in the past with a plurality of coefficients; and updating said plurality of coefficients using a value of correlation among said first to n-th signals in the past.

15. A signal processing apparatus comprising:

a first filter configured to produce, from a first mixed signal generated to have a first signal and a second signal mixed, an estimated value of said second signal in the past as a second estimated value;

a first subtracting section configured to remove said second estimated value from said first mixed signal to produce a first separated signal;

a second filter configured to produce, from a second mixed signal generated to have the first signal and second signal mixed, an estimated value of said first signal in the past as a first estimated value;

a second subtracting section configured to remove said first estimated value from said second mixed signal to produce a second separated signal; and an output section configured to output a changing mixture, of said first separated signal and said second separated signal as said first signal, which is controlled by a mixture of said first separated signal and said second separated signal.

16. A signal processing apparatus comprising:

a filter, for each natural number m from 1 to n, producing, from first to n-th mixed signals generated to have n signals from a first signal to an n-th signal mixed, estimated values of the first to n-th signals in the past other than an m-th signal in the past;

a subtracting section for removing said estimated values from said first to n-th mixed signals to produce first to n-th separated signals; and an output section configured to output a changing mixture, of said first to n-th separated signals as said first signal, which is controlled by a mixture of said first to n-th separated signals.

17. A non-transitory, computer readable medium comprising a signal processing program causing a computer to execute:

for extracting a first signal from a first mixed signal and a second mixed signal in which the first signal and a second signal are mixed, processing of determining an estimated value of said first signal in the past as a first estimated value;

processing of determining an estimated value of said second signal in the past as a second estimated value;

processing of removing said second estimated value from said first mixed signal to produce a first separated signal;

processing of removing said first estimated value from said second mixed signal to produce a second separated signal; and processing of outputting a changing mixture, of said first separated signal and said second separated signal as said first signal, which is controlled by a mixture of said first separated signal and said second separated signal.

18. A non-transitory, computer readable medium comprising a signal processing program causing a computer to execute:

for extracting a first signal using first to n-th mixed signals in which n signals from the first signal to an n-th signal are mixed, processing of, for each natural number m from 1 to n, determining estimated values of the first to n-th signals in the past other than an m-th signal in the past, and removing a sum of the estimated values from said m-th mixed signal to produce an m-th separated signal; and processing of producing a changing mixture, of said first to n-th separated signals, and outputting the signal as said first signal, wherein the changing mixture is controlled by a mixture of said first to n-th separated signals.

* * * * *